(12) United States Patent
Clarke et al.

(10) Patent No.: US 10,854,171 B2
(45) Date of Patent: Dec. 1, 2020

(54) MULTI-USER PERSONAL DISPLAY SYSTEM AND APPLICATIONS THEREOF

(71) Applicant: Samsung Electronics Co., Ltd., Suwon-si (KR)

(72) Inventors: Nigel A. Clarke, Mountain View, CA (US); Sergio Perdices-Gonzalez, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/400,971

(22) Filed: May 1, 2019

(65) Prior Publication Data

US 2020/0211508 A1 Jul. 2, 2020

Related U.S. Application Data

(60) Provisional application No. 62/786,725, filed on Dec. 31, 2018.

(51) Int. Cl.
| | | |
|---|---|---|
| *G09G 5/14* | (2006.01) | |
| *H04N 13/368* | (2018.01) | |
| *H04N 13/305* | (2018.01) | |
| *H04N 13/31* | (2018.01) | |
| *H04N 13/30* | (2018.01) | |

(52) U.S. Cl.
CPC ............ *G09G 5/14* (2013.01); *H04N 13/368* (2018.05); *G09G 2354/00* (2013.01); *G09G 2358/00* (2013.01); *H04N 13/305* (2018.05); *H04N 13/31* (2018.05); *H04N 2013/40* (2018.05)

(58) Field of Classification Search
CPC combination set(s) only.
See application file for complete search history.

(56) References Cited

U.S. PATENT DOCUMENTS

2007/0296874 A1 12/2007 Yoshimoto et al.
2010/0293502 A1* 11/2010 Kang ................... G06F 3/0488
715/803

(Continued)

FOREIGN PATENT DOCUMENTS

| EP | 2346021 A1 | 7/2011 |
| EP | 2693759 A2 | 5/2014 |
| JP | 2012181328 A | 9/2012 |

OTHER PUBLICATIONS

International Search Report and Written Opinion of the International Searching Authority in connection with International Application No. PCT/KR2019/018009 dated Apr. 8, 2020, 12 pages.

(Continued)

*Primary Examiner* — Deeprose Subedi

(57) ABSTRACT

A method includes determining one or more controlled viewpoints of a multi-user display which includes a pixelated array and a directional multiplexer, and for each viewpoint of the one or more controlled viewpoints, determining first content to be displayed to the controlled viewpoint according to a visibility criterion. The method further includes, for each viewpoint of the one or more controlled viewpoints, determining a first subset of pixels of the pixelated array whose visibility from the controlled viewpoint satisfies the visibility criterion, and rendering the first content to be displayed on the first subset of pixels of the pixelated array.

20 Claims, 20 Drawing Sheets

(56) References Cited

U.S. PATENT DOCUMENTS

| | | |
|---|---|---|
| 2011/0304613 A1 | 12/2011 | Thoresson |
| 2013/0113685 A1* | 5/2013 | Sugiyama .............. G09G 3/003 345/32 |
| 2013/0169765 A1 | 7/2013 | Park et al. |
| 2013/0293446 A1 | 11/2013 | Yoo |
| 2015/0109426 A1 | 4/2015 | Cho et al. |
| 2016/0021367 A1 | 1/2016 | Yoon et al. |

OTHER PUBLICATIONS

European Search Report in connection with European Application No. 19218729.2 dated Mar. 6, 2020, 14 pages.

* cited by examiner

FIG. 4
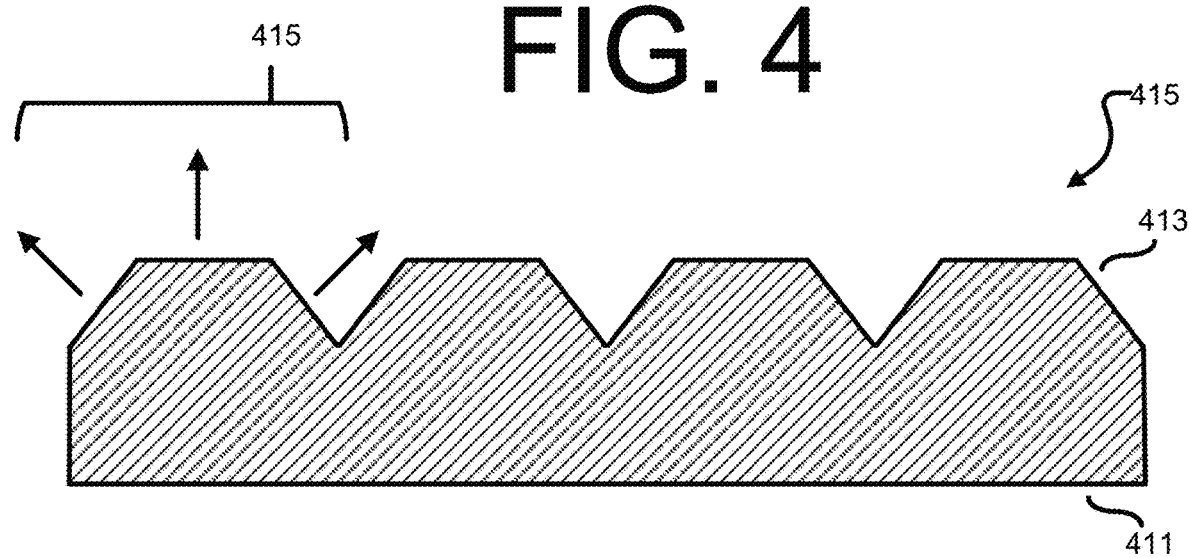
REFRACTIVE OPTICAL MULTIPLEXER
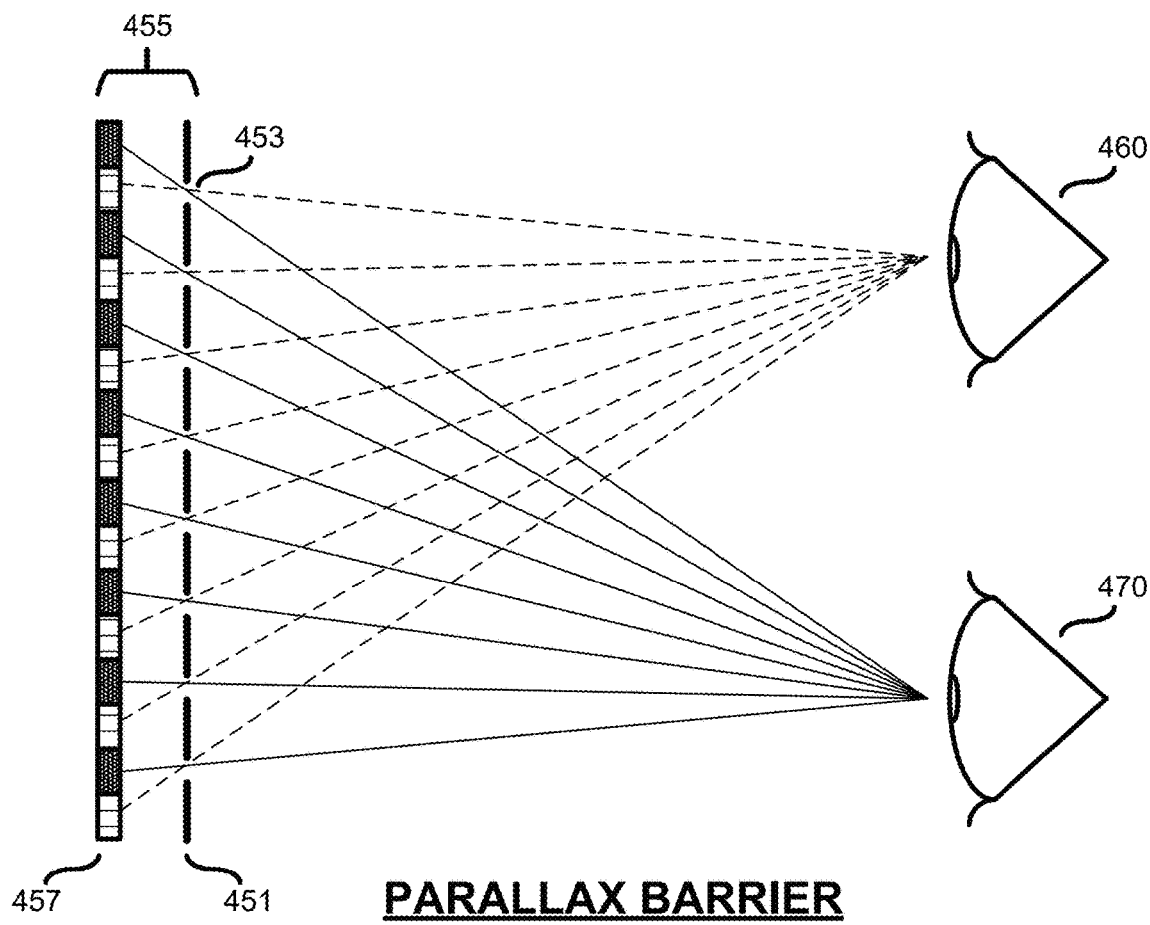
PARALLAX BARRIER

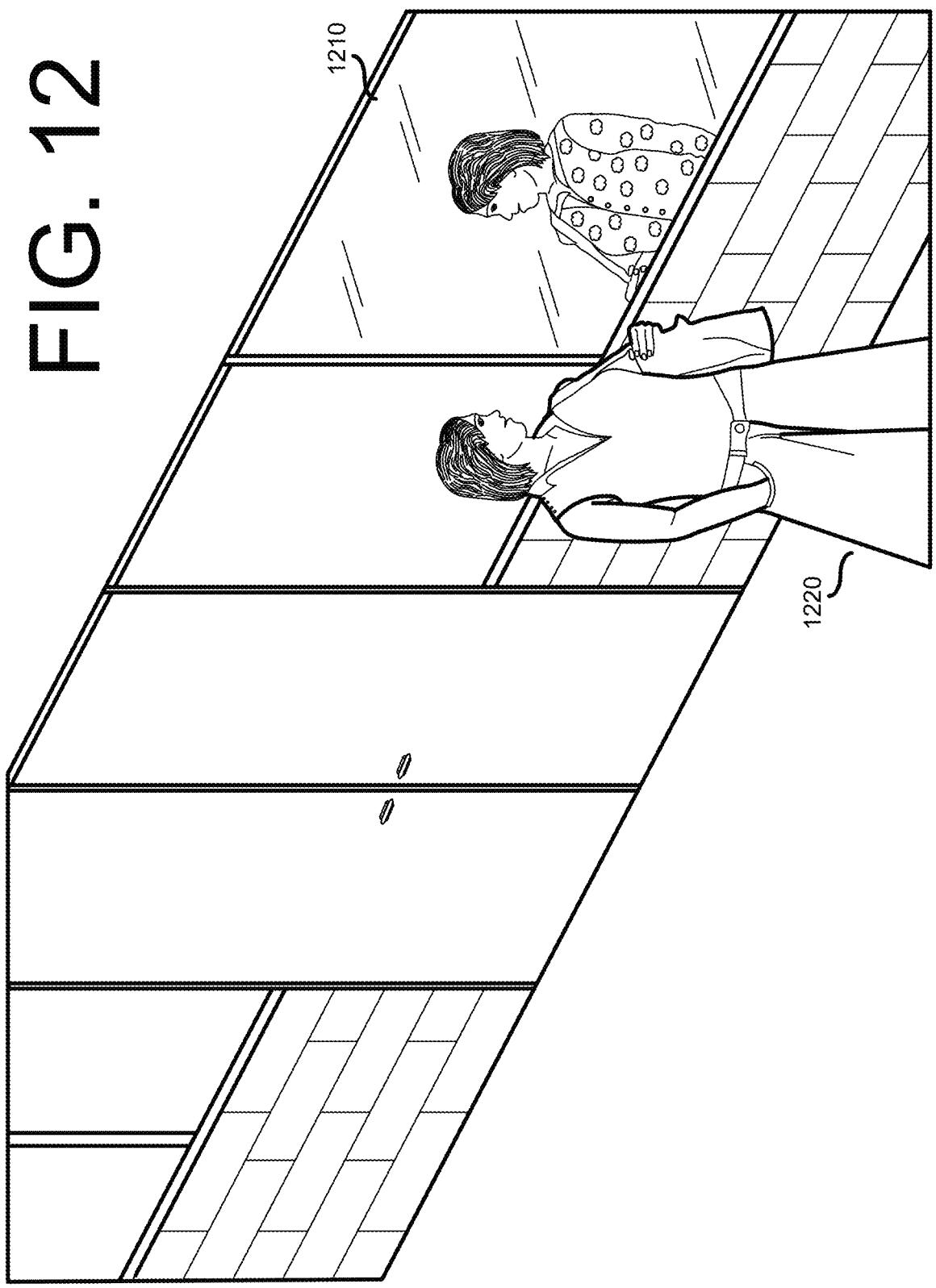

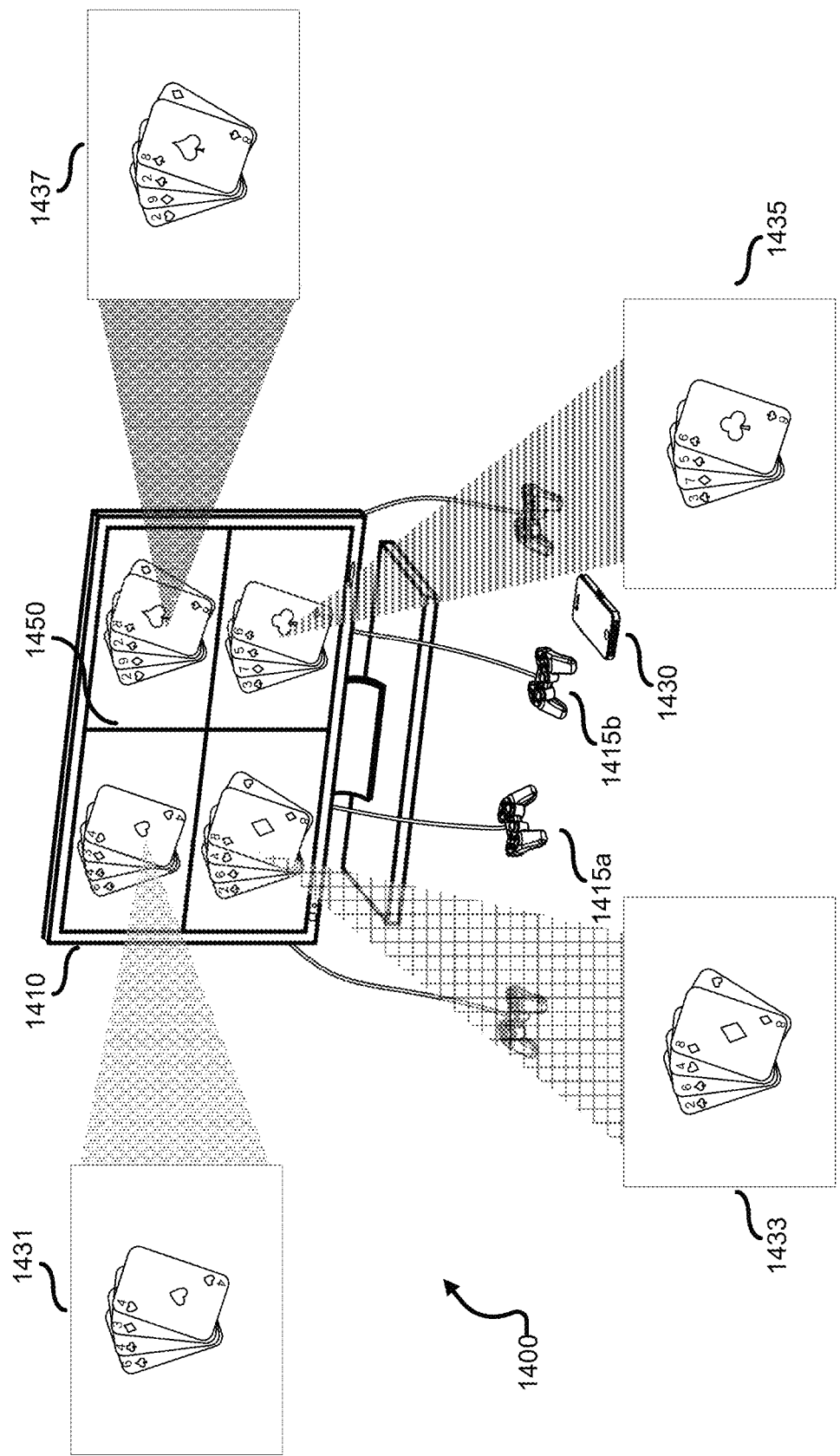

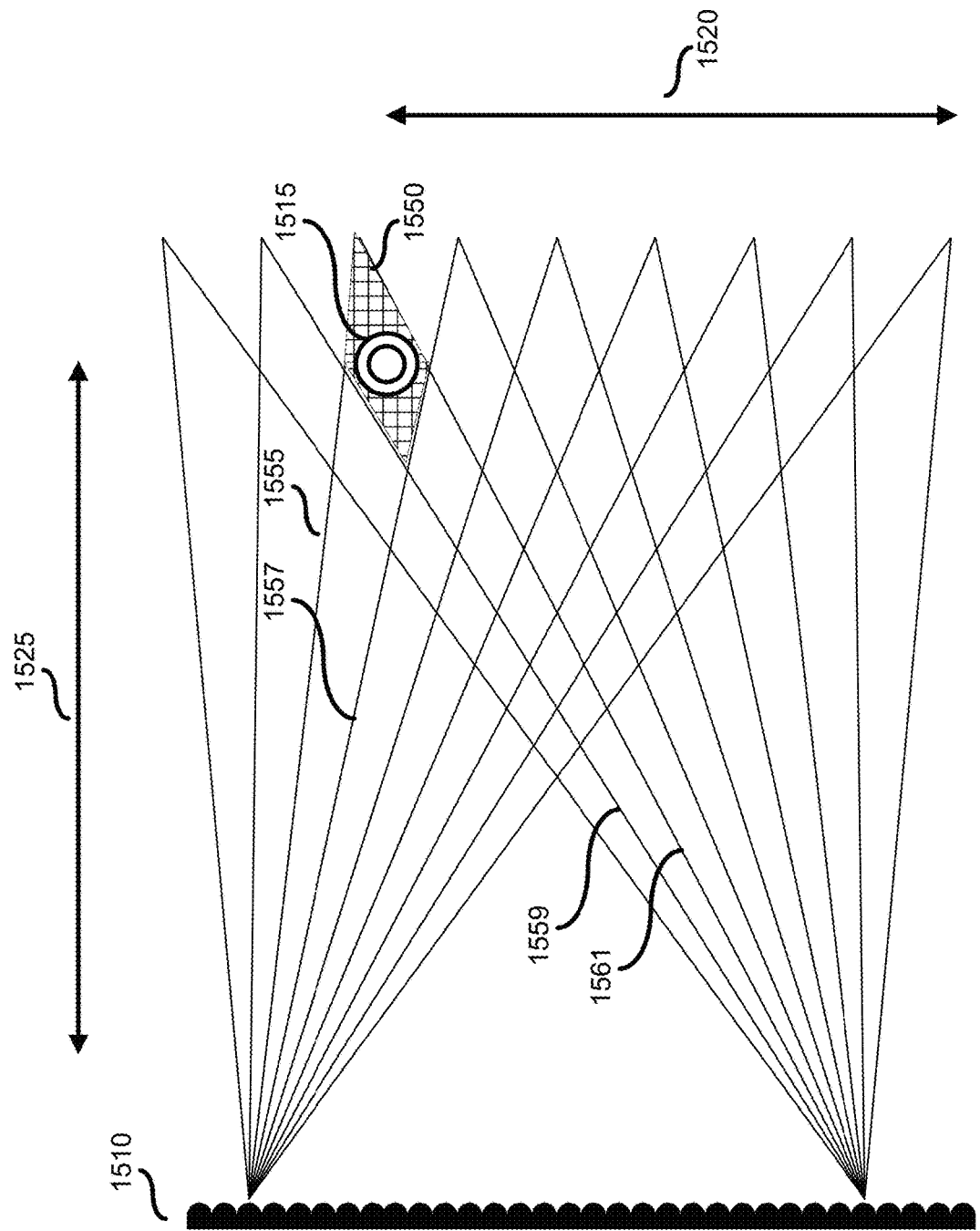

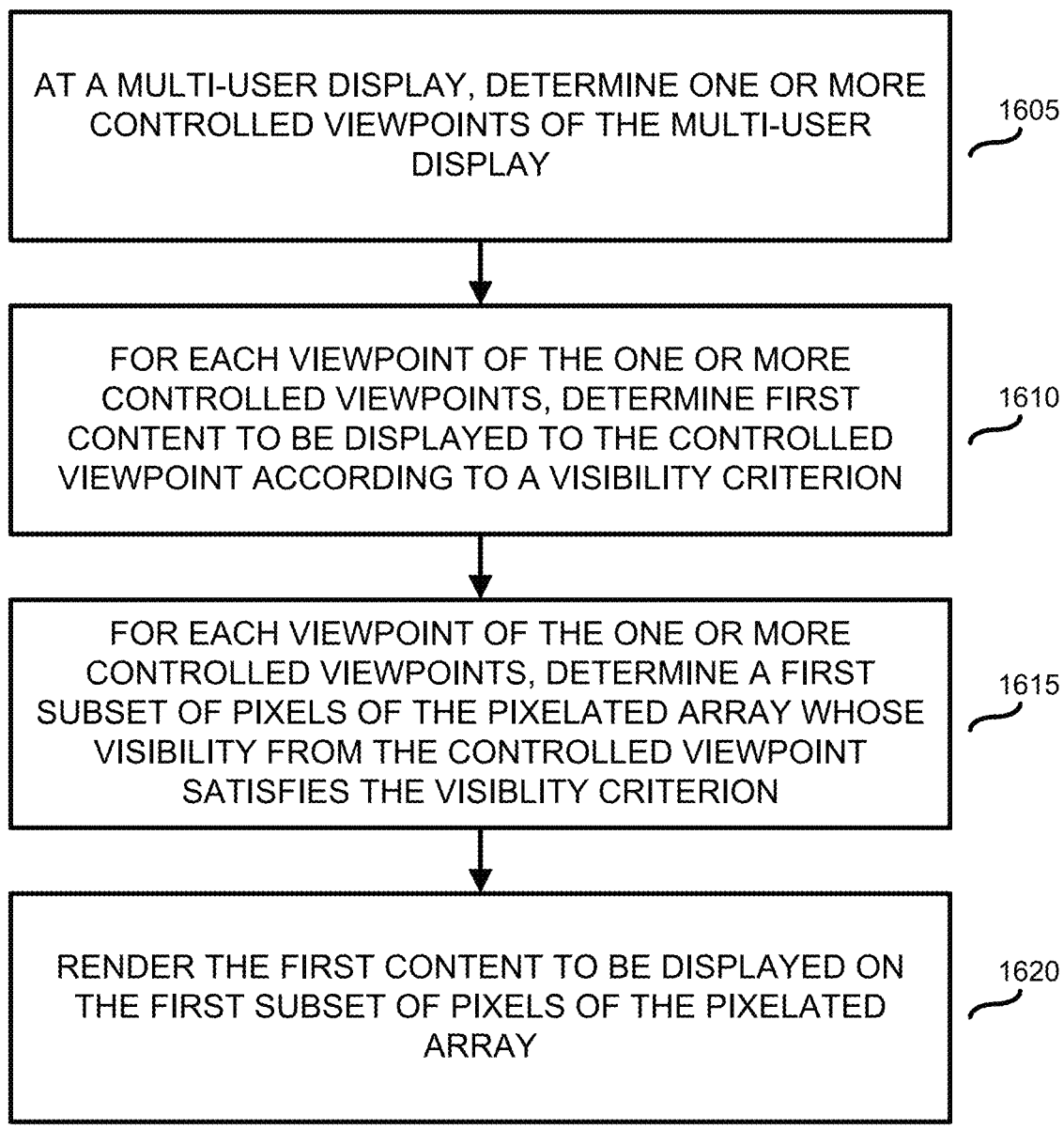

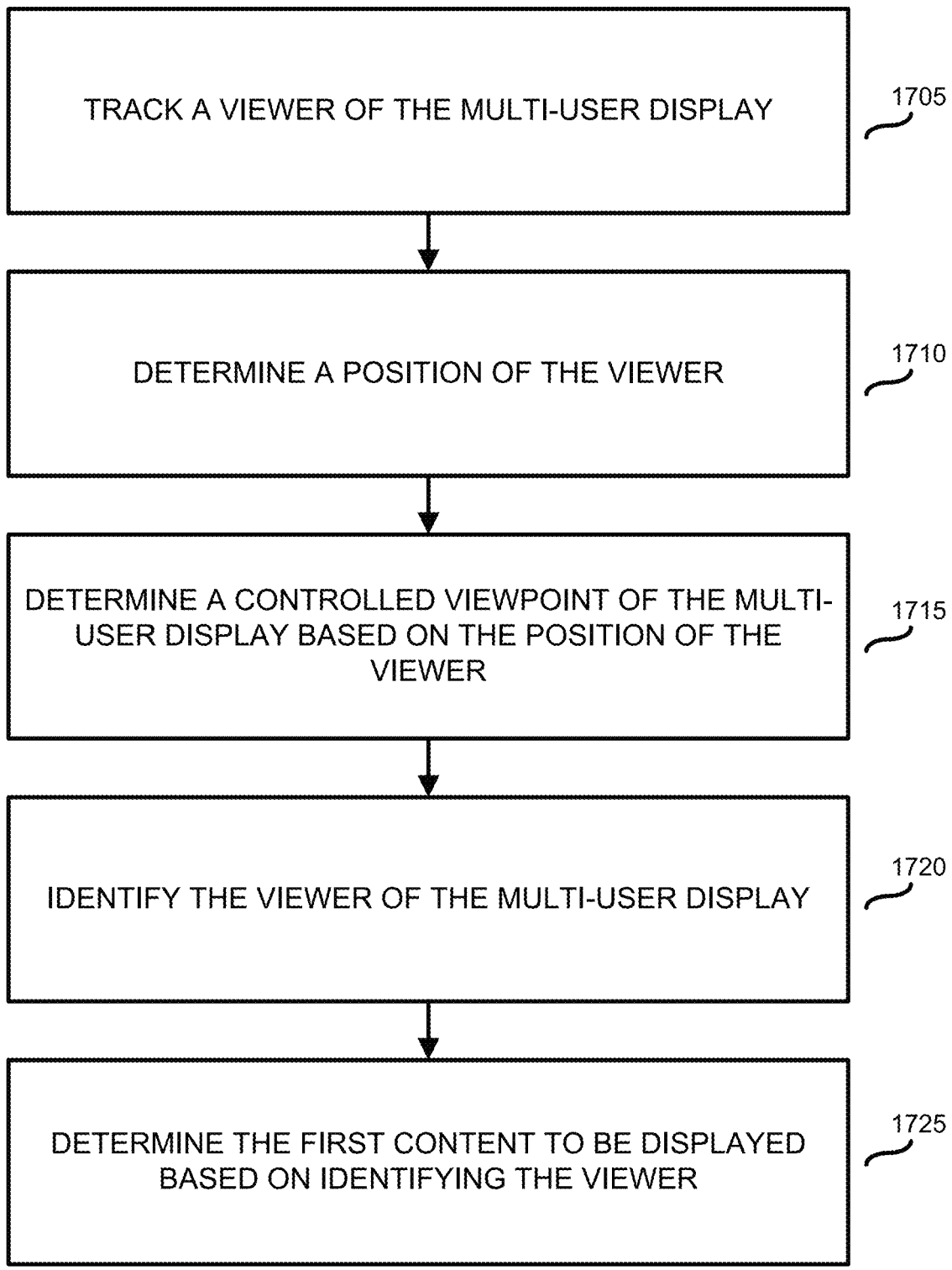

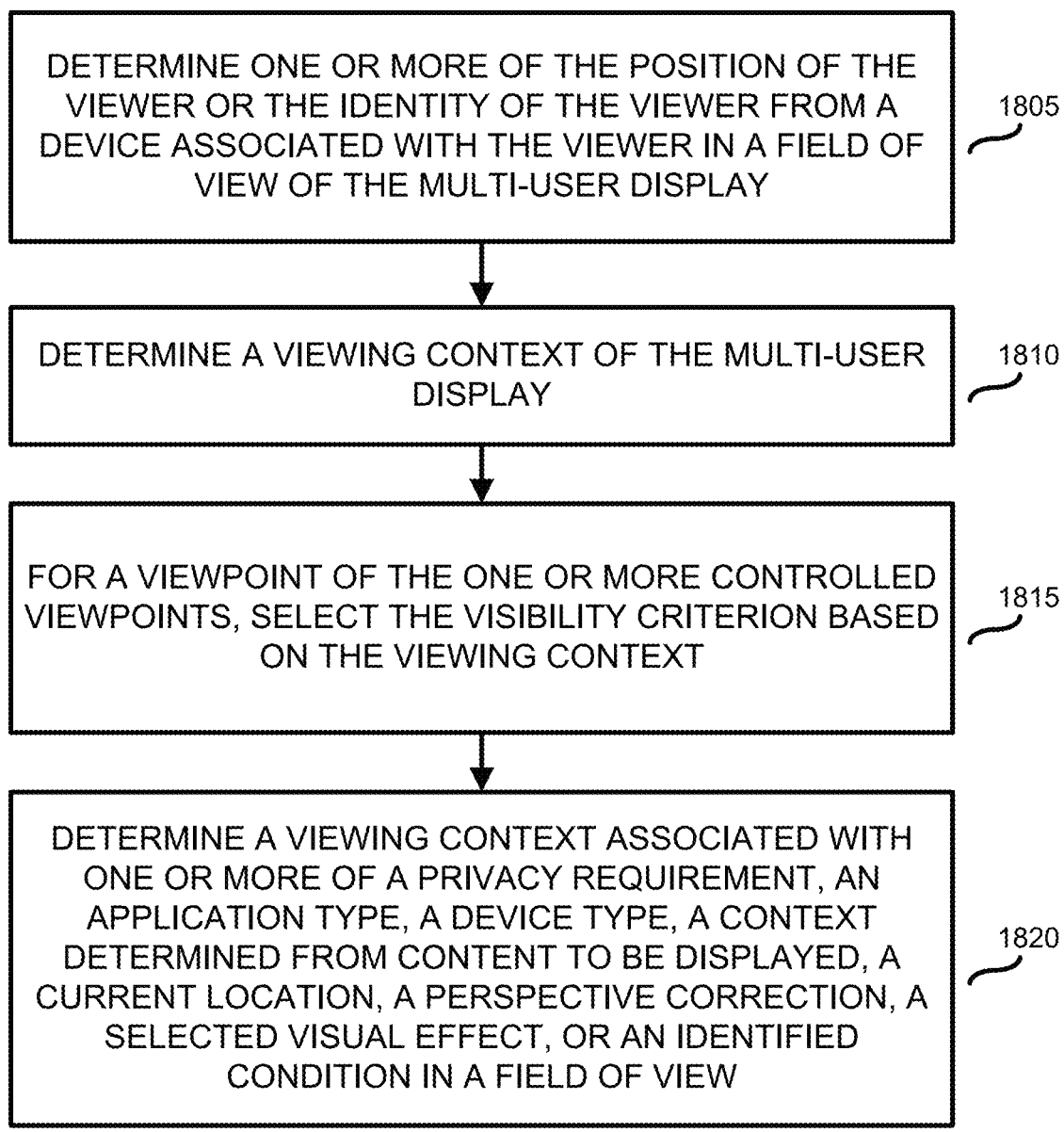

MULTI-USER PERSONAL DISPLAY SYSTEM AND APPLICATIONS THEREOF

CROSS-REFERENCE TO RELATED APPLICATION AND CLAIM OF PRIORITY

This application claims priority under 35 U.S.C. § 119(e) to U.S. Provisional Patent Application No. 62/786,725 filed on Dec. 31, 2018. The above-identified provisional patent application is hereby incorporated by reference in its entirety.

TECHNICAL FIELD

This disclosure relates generally to electronic displays. More specifically, this disclosure relates to a multi-user personal display system and applications thereof.

BACKGROUND

By interposing, for example, lenticular sheets or parallax barriers over the pixelated array of a display apparatus (for example, a flat screen television or a computer monitor having a specified resolution), it is possible to provide multi-view, or directionally dependent displays, wherein a viewer looking at the display from one viewing angle sees a different image than a viewer looking at the display from a different angle.

While the ability of directional displays to provide separate displays across different viewing angles presents exciting opportunities for more effectively utilizing the energy and space consumed by the display apparatus (such as, enabling adults to watch programs of parental interest while their children watch cartoons), opportunities and technical challenges associated with realizing the potential of display apparatus which support directional displays remain. For example, controlling the directionality and resolution of displays provided by the display apparatus remains a source of opportunity and technical challenge, at both a hardware level (such as, designing enhanced lenticular arrays), and hardware control level (such as, developing methods of rendering content for display on a multi-view display in a way that enforces the privacy of a particular viewer's directional display).

SUMMARY

This disclosure provides a multi-user personal display system and applications thereof.

In a first embodiment, a method includes determining one or more controlled viewpoints of a multi-user display which includes a pixelated array and a directional multiplexer, and for each viewpoint of the one or more controlled viewpoints, determining first content to be displayed to the controlled viewpoint according to a visibility criterion. The method further includes, for each viewpoint of the one or more controlled viewpoints, determining a first subset of pixels of the pixelated array whose visibility from the controlled viewpoint satisfies the visibility criterion, and rendering the first content to be displayed on the first subset of pixels of the pixelated array.

In a second embodiment, a multi-user display includes a pixelated array, a directional multiplexer and control logic. The control logic configured to determine one or more controlled viewpoints of the multi-user display, and for each viewpoint of the one or more controlled viewpoints, determine first content to be displayed to the controlled viewpoint according to a visibility criterion. Additionally, the control logic is further configured to, for each viewpoint of the one or more controlled viewpoints, determine a first subset of pixels of the pixelated array whose visibility from the controlled viewpoint satisfies the visibility criterion, and render the first content to be displayed on the first subset of pixels of the pixelated array.

In a third embodiment, a non-transitory computer-readable medium containing instructions, which when executed by a processor, cause a multi-user display to, at the multi-user display comprising a pixelated array and a directional multiplexer, determine one or more controlled viewpoints of the multi-user display, and for each viewpoint of the one or more controlled viewpoints, determine first content to be displayed to the controlled viewpoint according to a visibility criterion. When executed by the processor, the instructions further cause the multi-user display to, for each viewpoint of the one or more controlled viewpoints, determine a first subset of pixels of the pixelated array whose visibility from the controlled viewpoint satisfies the visibility criterion, and render the first content to be displayed on the first subset of pixels of the pixelated array.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates examples of optical multiplexers according to some embodiments of this disclosure;

FIG. 12 illustrates an example of content selected and rendered for display at a multi-user display based on a visibility criterion and a viewing context according to some embodiments of this disclosure;

FIG. 14 illustrates an example of content selected and rendered for display at a multi-user display based on a visibility criterion and viewing context according to certain embodiments of this disclosure;

FIGS. 15A and 15B illustrate an example of content selected and rendered for display at a multi-user display based on a visibility criterion and viewing context according to some embodiments of this disclosure;

FIG. 16 illustrates an example of operations of a method for providing a multi-user display according to certain embodiments of this disclosure;

FIG. 17 illustrates an example of operations of a method for providing a multi-user display according to various embodiments of this disclosure; and FIG. 18 illustrates an example of operations of a method for providing a multi-user display according to some embodiments of this disclosure.

DETAILED DESCRIPTION

FIGS. 1 through 18, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processor-based system for controlling a display.

Figure 1:
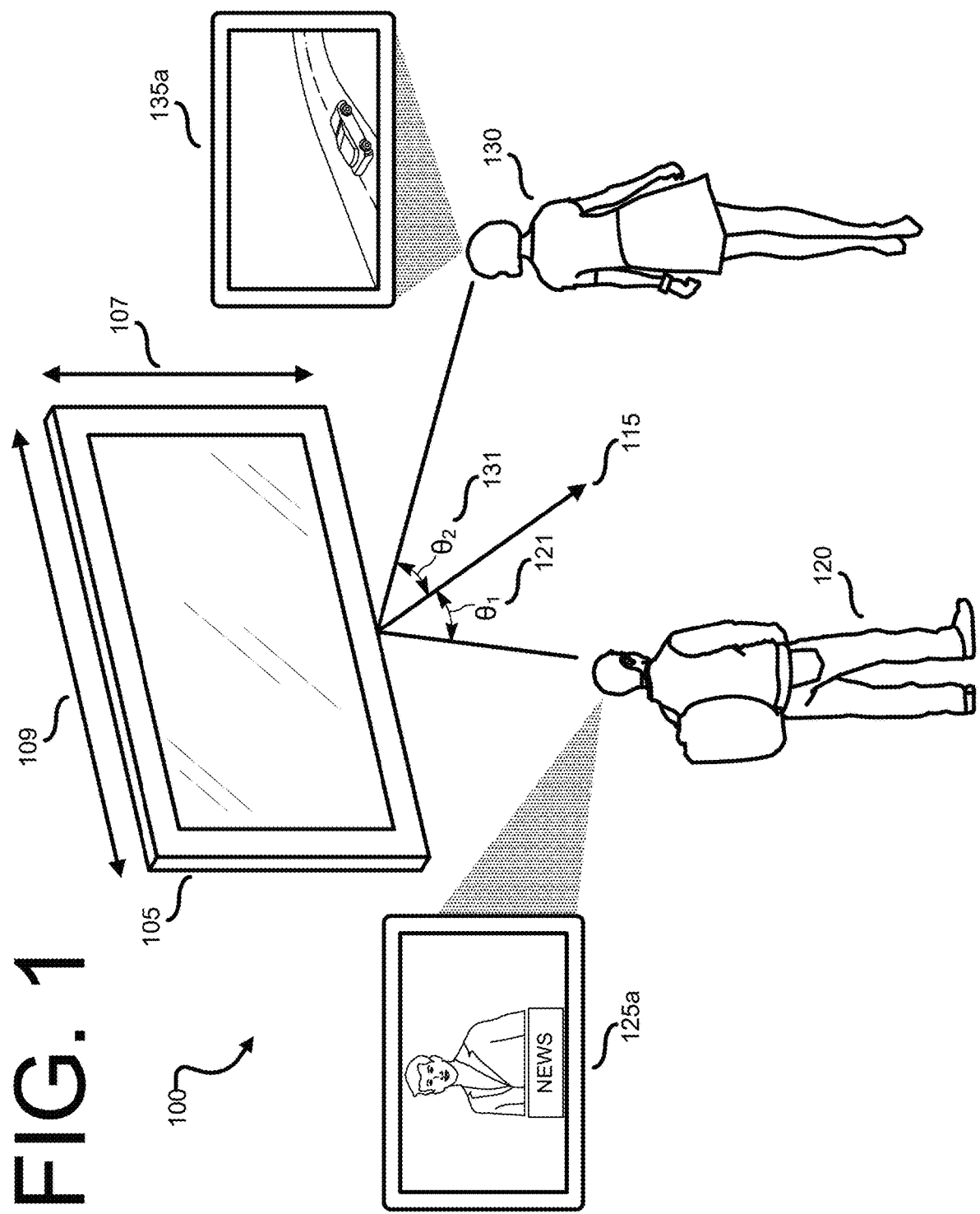
FIG. 1 illustrates an example of a scene that includes a multi-user display providing multiple directional displays according to some embodiments of this disclosure.

FIG. 1 illustrates an example of a scene 100 that includes a multi-user display providing multiple directional displays, according to various embodiments of this disclosure. The embodiment of the scene 100 shown in in FIG. 1 is for illustration only and other embodiments could be used without departing from the scope of the present disclosure. In the non-limiting example shown FIG. 1, the elements of scene 100 comprise a multi-user display 105, a first viewer 120, and a second viewer 130.

In certain embodiments of this disclosure, the multi-user display 105 includes a pixelated array comprising pixels disposed in a pattern which repeats at a first spacing along a first axis 107 and at a second spacing along a second axis 109. In certain embodiments, each constituent pixel of the pixelated array may further comprise one or more subpixels (for example, a red subpixel, a green subpixel and a blue subpixel) disposed according to a subpixel pattern. In various embodiments, the multi-user display 105 further comprises an optical multiplexer, such as a lenticular array or parallax barrier, having an optical feature (for example, a curved cross section) pattern which runs along first axis 107 and repeats at a specified spacing along second axis 109. According to some embodiments, the optical multiplexer may be disposed at an angle, or otherwise offset from the axes of repetition of the pixelated array.

While certain examples in this disclosure explain embodiments of a multi-user display 105 wherein content is rendered for display on an emissive pixelated array comprising a backlit light filter, embodiments according to this disclosure are not so limited, and pixelated arrays embodying other display technologies are within the contemplated scope of this disclosure. For example, in certain embodiments, instead of a backlit color filter, a pixelated array is an organic light emitting diode (OLED) array. Additionally, pixelated arrays according to certain embodiments of this disclosure include pixelated arrays using reflective imaging technologies, such as electronic paper, electrophoretic displays, electrowetting displays or electrofluidic displays.

In the non-limiting example of FIG. 1, the optical multiplexer of multi-user display 105 directs light from a first set of lines of pixels of the pixelated array belonging to a first set of coordinates along second axis 109 in a first direction, and directs light from a second set of lines of pixels of the pixelated array belonging to a second set of coordinates along second axis 109 in a second direction, the second direction being different from the first direction. In some embodiments, where the structure of the optical multiplexer does not parallel that of the pixelated array, the groups of pixels associated the first and second sets of pixels may be disposed in clusters, rather than lines of pixels.

According to various embodiments, the operation of the optical multiplexer of multi-user display 105 creates two or more directional displays selected to satisfy visibility criteria (for example, a range of viewing angles and viewing distances at which a display is visible) associated with a particular viewing context (for example, a number of viewers, and privacy requirements associated with a directional display). Depending upon a variety of factors, including without limitation, one or more viewing criteria and a viewing context, multi-user display 105 may be configured such that viewers within a first range of angles in a plane defined by second axis 109 and third axis 115 will primarily see images appearing on pixels from the first set of lines of pixels. Similarly, given a particular viewing context and visibility criteria, multi-user display 105 may be configured such that viewers within a second range of angles in the plane defined by second axis 109 and third axis 115 will primarily see images that appear on pixels from the second set of lines of pixels.

In the non-limiting example shown FIG. 1, the first viewer 120 is looking at multi-user display 105 at a first viewing angle 121, which is within the first range of angles in the plane defined by second axis 109 and third axis 115. Accordingly, the first viewer 120 primarily sees images appearing on pixels from the first set of lines of pixels. Leveraging the fact that only a known subset of the total pixels of multi-user display 105 are visible to the first viewer 120, the pixel control logic (which can be implemented via hardware, software, or combinations thereof) within multi-user display 105, or a graphics pipeline of a source device (for example, a laptop computer or digital media player) to multi-user display 105 renders content from a first source to be presented on only pixels from the first set of lines of pixels. Accordingly, the first viewer 120 sees first directional display 125a, which displays content from a news program. Similarly, the second viewer 130 is looking at multi-user display 105 from a second viewing angle 131, which is within the second range of angles in the plane defined by second axis 109 and third axis 115. Again, due to the structure and geometry of an optical member of multi-user display 105, primarily the pixels of multi-user display 105 belonging to the second set of lines of pixels are visible to the second viewer 130. Similarly, the pixel control logic of multi-user display 105 or a graphics pipeline of a source device to multi-user display 105 renders content from a second source to be presented on only pixels from the second set of lines of pixels. Accordingly, when looking at multi-user display 105 at second viewing angle 131, the second viewer 130 sees a second directional display 135a associated with content from the second source (in this example, a driving scene from a movie).

Figure 2:
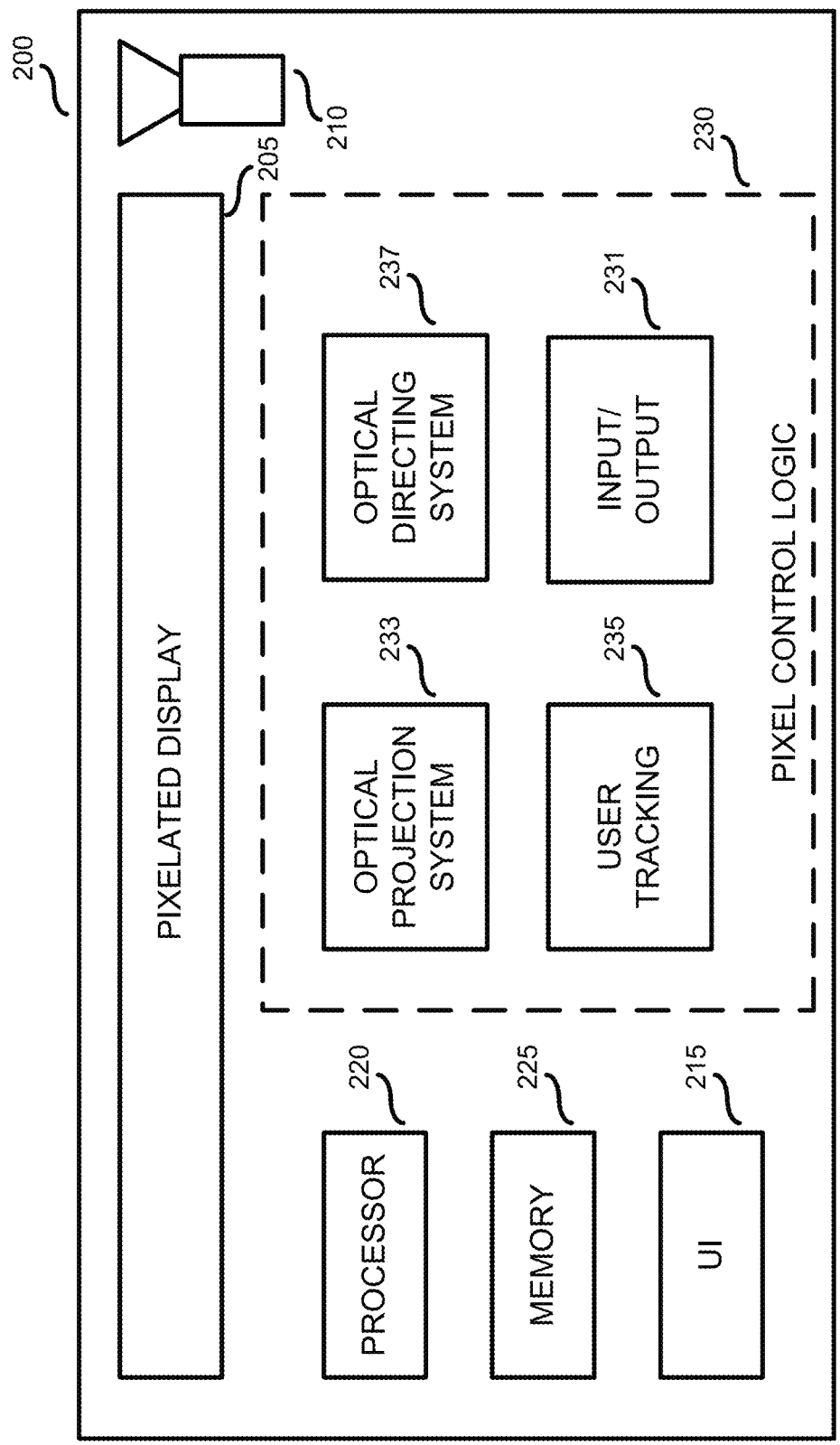
FIG. 2 illustrates a block diagram of a multi-user display according to certain embodiments of this disclosure.

FIG. 2 illustrates, in block diagram format, an example of a multi-user display 200 according to some embodiments of this disclosure. The embodiment of the multi-user display 200 shown in FIG. 2 is for illustration only and other embodiments could be used without departing from the scope of the present disclosure.

In the non-limiting example shown in FIG. 2, the multi-user display 200 comprises pixelated display 205. According to various embodiments, the pixelated display 205 comprises an array of pixels whose chromatic properties can be controlled based on a rendering of digital content for display in a directional display provided by multi-user display 200. According to some embodiments, the array of pixels comprises a backlit color filter, composed of pixels containing subpixels configured to filter the passage of light from a backlight in the color channels of a color model (for example, the red-green-blue "RGB" color model, or the cyan-magenta-yellow-black "CMYK" color model). According to certain embodiments, the array of pixels comprises an array of organic light emitting diodes (OLED), the chroma and intensity of whose emissions can be controlled to provide pixels of a specified color and brightness. In the non-limiting example of FIG. 2, pixelated display 205 further comprises an optical multiplexer (for example, a lenticular array or parallax barrier) having a pattern of optical features that repeats at predictable intervals relative to the spacing of pixels of the array of pixels. In some embodiments, the optical features of the optical multiplexer direct light from sets of lines of pixels within the array of pixels in a common direction, thereby producing two or more directional displays, wherein each directional display primarily comprises content from a given set of lines of pixels within the array of pixels.

According to various embodiments, multi-user display 200 comprises field sensor 210, which is configured to collect data regarding activity within one or more fields of view of the multi-user display 200. According to certain embodiment, field sensor 210 obtains data (for example, a number of recognized faces), from which a viewing context of multi-user display 200 can be determined. In some embodiments, field sensor 210 is a camera (for example, an RGB digital video camera utilizing a CMOS sensor to collect image data from a field of view) utilized to detect the presence and location of viewers of multi-user display 200. According to various embodiments, field sensor is 210 is a dynamic vision sensor (DVS) sensor configured to detect changes in the intensity of light (for example, changes of light associated with a viewer moving relative to multi-user display 200) received from a field of view. In certain embodiments, the field sensor 210 comprises one or more passive infrared motion detectors (PIR) configured to detect the presence and general motion of heat emitting objects (typically humans) in one or more fields of view of multi-user display 200.

In certain embodiments according to this disclosure, field sensor 210 is physically incorporated within multi-user display 200. In some embodiments according to this disclosure, multi-user display 200 comprises a field sensor 210 which is physically separate from multi-user display 200. For example, a combination of hardware and software in a device (for example, a smartphone), whose location can be a reasonable proxy for a viewer's location may function as a field sensor, by providing multi-user display 200 data regarding the presence and motion activity of a viewer.

In some embodiments, multi-user display 200 provides an interactive display surface (for example, a screen capable of detecting touch and gesture inputs provided through a user's fingers or with a stylus). Accordingly, field sensor 210 may comprise a plurality of sensors configured to discern the source (for example, determining which user is touching multi-user display 200) and character (for example, detecting gestures) of touch or gesture inputs. As one illustrative example, field sensor 210 may include a plurality of near field cameras or other sensors to help associate recognized faces in a visual field of multi-user display with hands, stylus or other instruments of interaction with multi-user display 200.

As shown in FIG. 2, the multi-user display 200 further comprises a user interface 215. According to certain embodiments, the user interface 215 may be a remote control for controlling the volume and channel selection, and on/off state of multi-user display 200. In some embodiments, user interface 215 is implemented as software running on a separate device (for example, smartphone) providing users with similar control over display and content parameters as a remote control. Additionally, in various embodiments, user interface 215 may support functionality for receiving feedback or other commands for tuning or adjusting one or more directional displays provided by multi-user display 200.

According to some embodiments, multi-user display 200 comprises processor 220, which comprises one or more physical processing units (for example, a central processing unit (CPU) and/or a graphics processing unit (GPU)) capable of executing instructions stored in memory 225 to implement pixel control logic 230.

In certain embodiments, the multi-user display 200 comprises memory 225, which is a non-transitory memory (for example, a solid state drive "SSD" or programmable read-only memory "PROM") containing instructions, which, when executed by processor 220, cause multi-user display 200 to implement pixel control logic 230, to control the array of pixels of pixelated display 205 to provide one or more directional displays satisfying one or more visibility criteria (for example, the directional display is visible to a first user, but not a second user).

As shown in the non-limiting example of FIG. 2, pixel control logic 230 controls the placement and properties (for example, brightness and color) of rendered pixels within an array of pixels (for example, the array of pixels in pixelated display 205) to variously exploit and mitigate optical properties of an optical multiplexer (for example, the optical multiplexer in pixelated display 205), which primarily vary along a defined axis to provide one or more directional displays. Accordingly, pixel control logic 230 is able to control the visibility of one or more directional displays across regions of a field of view of multi-user display 200.

As an illustrative example, consider the case of a lenticular array (for example, a sheet of polycarbonate or another substantially transparent material having a flat back side and a front side with a corduroy-like grained surface), the directionality (for example, which viewers can see the light) of light passing through the sheet can depend substantially on the light's point of incidence on the flat first side. If the light strikes the back side of the sheet at a first point, the light may be visible to a first viewer, but not a second viewer. However, if the light strikes the back of the lenticular array at a second point laterally offset relative to the "grain" created by the optical elements of the array, the light may be steered in a different direction, and now visible to the second viewer, but not the first. According to various embodiments, pixel control logic 230 controls the points of incidence of light from an array of pixels relative to an optical multiplexer to provide and enhance a directional display provided by multi-user display 200.

Additionally, in some embodiments according to this disclosure, the lenticles of the lenticular array may be "reversed" such that the curved side of the array faces inwards, and the flat side of the lenticular array faces the viewer.

As shown in the non-limiting example of FIG. 2, pixel control logic 230 comprises an input-output system 231, an optical projection system 233, a user tracking system 235 and an optical directing system 237. According to various embodiments, systems 231, 233, 235 and 237 are implemented as software. In some embodiments, systems 231, 233, 235 and 237 are implemented as hardware or a combination of hardware and software.

According to certain embodiments, input/output system 231 provides an interface for, without limitation, receiving one or more items of digital content (for example, image or video data) to be rendered and presented in a directional display provided by multi-user display 200. According to some embodiments, digital content is received at input/output system 231 as rendered pixels (for example, from a graphics pipeline implemented in a source device). In various embodiments, digital content is received at input/output system in a format (for example, a video file) requiring rendering at multi-user display 200. In some embodiments, input/output system 231 comprises a suite of hardware interfaces (such as RCA or HDMI interfaces) for receiving digital content. In certain embodiments, input/output system also comprises an interface for receiving data from field sensor 210, or one or more feedback sensors in a field of view of multi-user display 200.

In some embodiments, optical projection system 233 selects which pixels of the array of pixels of pixelated display 205 digital content received at input-output system 231 is to be displayed on, as well as adjustments to the location and properties of the selected pixels based on feedback and user tracking information provided through one or more of input/output system 231, user tracking system 235, and optical directing system 237. Additionally, in certain embodiments, optical projection system 233 provides control signals for the pixels within the array of pixels of pixelated display 205.

In various embodiments of this disclosure, optical directing system 237 determines the directionality of one or more directional displays of multi-user display 200, and provides information regarding the determined directionality to optical projection system 233. According to certain embodiments, determining the directionality of a directional display comprises assigning content received via input/output system 231 to one of the ranges of viewing angles associated with an optical multiplexer. For example, when the optical multiplexer comprises a lenticular array composed of trapezoidal lens elements, which split incident light along three primary directions, determining the directionality of the directional display may comprise assigning the directional display to one of the three primary directions associated with the optical multiplexer. In other embodiments, where the properties of the optical multiplexer allow a display direction to be slightly changed in response to slight offsets in the point of incidence of light at the multiplexer, determining the directionality of a directional display can comprise determining the angular shift. According to various embodiments, optical directing system 237 receives information from user tracking system 235 to determine the directionality of one or more directional displays.

In certain embodiments according to this disclosure, user tracking system 235 receives information from one or more sensors (for example, field sensor 210) associated with the position of viewers of multi-user display 200, and provides the data to optical directing system 237 and/or optical projection system 233 for adjustments in one or more control parameters of an array of pixels (for example, a lateral offset of a rendered pixel) to be made in response to the tracked position of a user.

Figure 3:
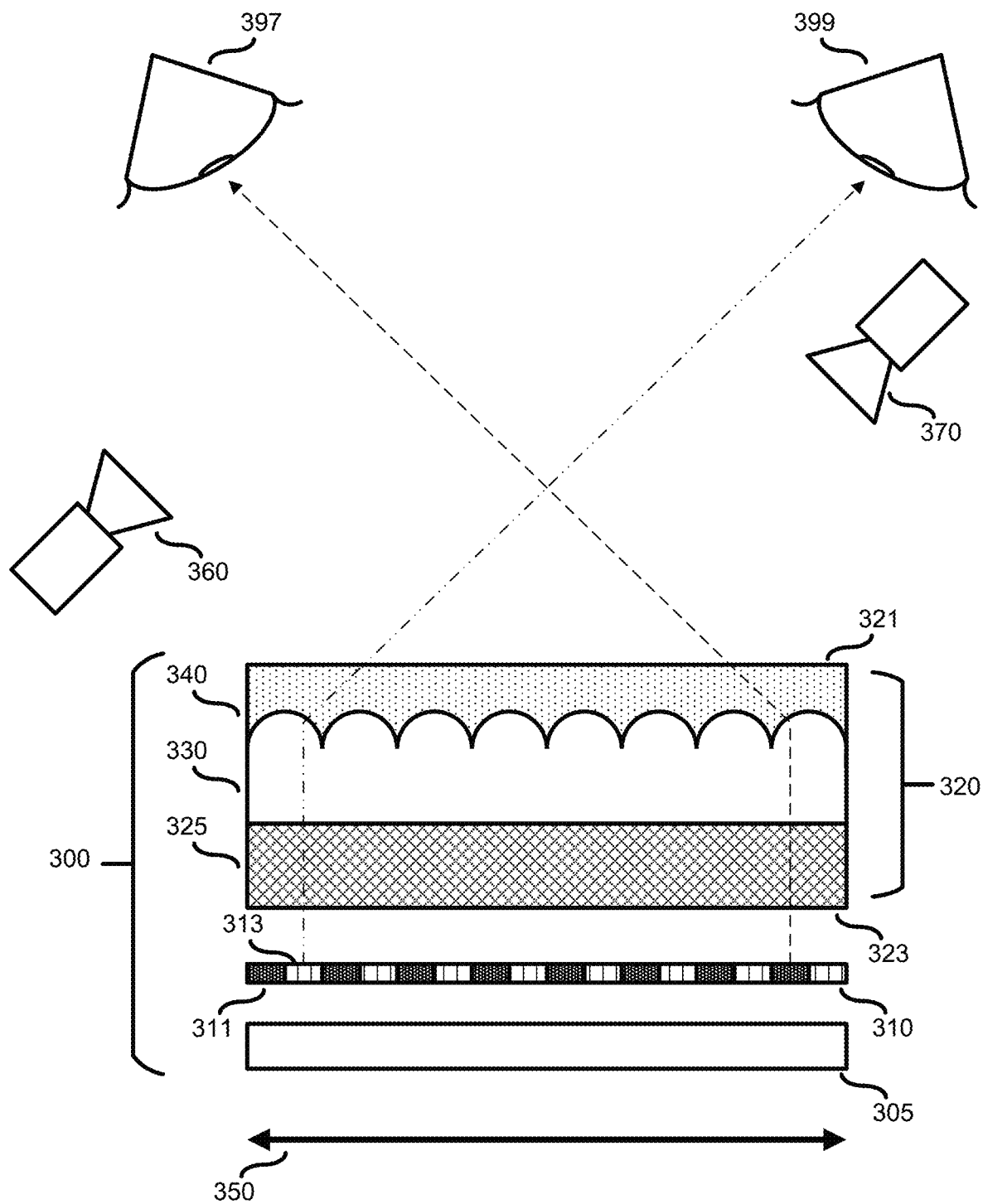
FIG. 3 illustrates components of a multi-user display according to various embodiments of this disclosure.

FIG. 3 illustrates an example of components of a multi-user display 300 according to some embodiments of this disclosure. The embodiment of the multi-user display 300 shown in FIG. 3 is for illustration only and other embodiments could be used without departing from the scope of the present disclosure.

Referring to the non-limiting example of FIG. 3, a multi-user display 300 is shown, as well as a first viewpoint 397 and a second viewpoint 399. In this illustrative example, first viewpoint 397 is disposed at an angle relative to multi-user display 300 within a first range of viewing angles, and second viewpoint 399 is disposed at an angle within a second range of viewing angles. According to various embodiments, multi-user display 300 can switch between a multi-view mode and a single display mode in response to visibility criteria associated with a viewing context. Additionally, according to certain embodiments, multi-user display 300 can "steer" a directional display towards one or more determined viewpoints.

For example, a "privacy enforcing" viewing context may be associated with multi-user display 300 operating in a multi-view mode of operation. When multi-user display 300 is in a multi-view mode of operation, viewpoints located within the first range of viewing angles (for example, first viewpoint 397) primarily see content rendered by a first set of lines of pixels of multi-user display 300, and viewpoints within the second range of viewing angles (for example, second viewpoint 399) primarily see content rendered by a second set of lines of pixels of multi-user display 300.

According to certain embodiments, multi-user display 300 is constructed as a "flat screen" display (for example, a television, computer monitor, or tablet screen). In the non-limiting example of FIG. 3, multi-user display 300 comprises backlight 305, which contains one or more light sources (for example, light emitting diodes or a cold cathode fluorescent lamp ("CCFL")) emitting light at visible frequencies which can be filtered by the pixels of color filter 310. According to some embodiments, backlight 305 further comprises a diffuser or light guide to ensure that the backlight produces even light. In some embodiments, backlight 305 is dynamically and or locally controlled to improve energy consumption and the dynamic range of the display (for example, by producing darker blacks).

In some embodiments, multi-user display 300 comprises color filter 310, which is disposed between backlight 305 and first and second viewpoints 397 and 399. As shown in the illustrative example of FIG. 3, color filter 310 comprises a plurality of pixels (for example, first pixel 311 and second pixel 313) repeating at a regular spacing along axis 350. According to various embodiments, the first pixel 311 comprises one or more sub pixels associated with a color channel of a color model (for example, red-green-blue ("RGB")) through which light from backlight 305 passes. In this illustrative example, a sub-pixel comprises a liquid crystal display (LCD) filter, which is electronically controlled to control the passage of light from backlight 305 within a specified color channel. In certain embodiments, the combined operation of each subpixel of first pixel 311 allow first pixel 311 to appear as a point of light having a specified color and brightness.

In the non-limiting example shown in FIG. 3, the multi-user display 300 further comprises lenticular layer 320. According to various embodiments, lenticular layer 320 is a transparent sheet disposed between color filter 310 and first and second viewpoints 397 and 399. In certain embodiments, the lenticular layer 320 includes a substantially flat first exterior side 321 and a substantially flat second exterior side 323. In the non-limiting example shown FIG. 3, the first exterior side 321 is disposed on the exterior of multi-user display 300, and the second exterior side 323 is disposed in front of both backlight 305 and color filter 310.

According to certain embodiments, the lenticular layer 320 comprises a first layer 325, which is composed of a substantially transparent material (for example, silicon dioxide coated glass or polycarbonate). Additionally, the transparent material has an index of refraction that is uniform throughout first layer 325.

In some embodiments, the lenticular layer 320 comprises a second layer 330 which is composed of a section of material which is substantially flat on a side contacting first layer 325 and which has a lenticularly patterned cross section which repeats at a regular spacing along axis 350. According to certain embodiments, when the index of refraction of second layer 330 differs from the index of refraction of third layer 340, multi-user display 300 operates in a multidirectional mode, providing two or more directional displays, wherein the lenticularly patterned cross section of second layer 330 acts as a lens, and directs the light passing from a first set of pixels within color filter 310 to a first set of viewing angles, and the light passing from a second set of pixels within color filter 310 to a second set of viewing angles. As shown in the illustrative example of FIG. 3, when the index of refraction of second layer 330 differs from the index of refraction of third layer 340, a viewer at first viewpoint 397 primarily sees light filtered by a first set of pixels, which includes first pixel 311 (identified in FIG. 3 as white dots on a black background). Similarly, when the index of refraction of second layer 330 differs from the index of refraction of third layer 340, a viewer at second viewpoint 399 primarily sees light filtered by a second set of pixels, which includes second pixel 313 (identified in FIG. 3 by vertical cross hatching). According to various embodiments, including embodiments where second layer 330 is constructed using liquid-crystal infiltrated micro cavities, the index of refraction of second layer 330 is variable, and can be tuned to match the index of refraction of third layer 340. In such embodiments, when the index of refraction of second layer 330 is tuned to match that of third layer 340, multi-user display 300 is no longer operating in a multidirectional mode, and viewers at first viewpoint 397 and second viewpoint 399 see light filtered through substantially the same set of pixels of color filter 310.

As shown in the non-limiting example of FIG. 3, the lenticular layer 320 further comprises third layer 340, which includes first exterior side 321, and a second side following the contours of the lenticular pattern of second layer 330. According to various embodiments, third layer 340 has at least one index of refraction which is different than the index of refraction of second layer 330. According to various embodiments, the index of refraction of third layer 340 is variable, and can be tuned to match the index of refraction of second layer 330 to support modes in which multi-user display 300 provides directional displays, and modes in which viewers of multi-user display 300 see light filtered through a substantially common subset of the pixels of color filter 310.

In certain embodiments, the multi-user display 300 includes a field sensor 360. In certain embodiments, the multi-user display 300 is connected to the field sensor 360. According to various embodiments, the field sensor 360 is a field sensor (for example, field sensor in FIG. 2) configured to collect data regarding users' positions and movement and conditions of interest (for example, ambient light levels) to be provided to the control logic (for example, pixel control logic 230 in FIG. 2) for multi-user display 300. According to certain embodiments, the field sensor 360 is a digital camera configured to collect image data for facial recognition to assist in tracking users' movement across fields of view of multi-user display 300.

In certain embodiments, multi-user display 300 includes one or more calibration sensors 370, each of which is a sensor configured to detect undesirable visual effects (for example, images from another directional display appearing in a directional display, also known as "ghosting") which can be corrected by the control logic of multi-user display 300 (for example, by optical projection system 233 in FIG. 2) through changes in the placement of pixels relative to second layer 330, and/or the chromatic filtering properties of pixels. According to certain embodiments, the calibration sensor 370 obtains data regarding relevant properties of multi-user display 300 (for example, variations in the angle of elements of an optical multiplexer relative to lines of pixels). In some embodiments, calibration sensor 370 comprises a digital camera.

Although FIG. 3 illustrates one example of a multi-user display, various changes may be made to FIG. 3. For example, in certain embodiments (for example, organic light-emitting diode ("OLED")) displays, a single pixelated array of light emitting diodes may serve as both backlight 305 and color filter 310. Additionally, in certain embodiments, second layer 330 may have a constant index of refraction, and the index of refraction of third layer 340 varies to match or differ from the index of refraction of second layer 330. In some embodiments, first layer 325 provides a reinforcing substrate for second layer 330, or acts as an optical spacer to position pixels of color filter 310 in the focal plane of lenticular elements of second layer 330. Further, in certain embodiments, first layer 325 of lenticular layer 320 is unnecessary and may be omitted.

FIG. 4 illustrates examples of optical multiplexers according to certain embodiments of this disclosure. The embodiment of the optical multiplexers shown in FIG. 4 is for illustration only and other embodiments could be used without departing from the scope of the present disclosure.

In the non-limiting example shown in FIG. 4, two examples of optical multiplexers are depicted. The two examples include a refractive multiplexer 401 and parallax barrier 451, both of which cause different sets of elements (for example, lines of pixels or subpixels) of a pixelated array (for example, backlit color filter 310 of FIG. 3, or an OLED array) to be primarily visible across different viewing angles relative to a common axis.

According to certain embodiments, an optical multiplexer can be a refractive multiplexer, such as refractive multiplexer 401. In some embodiments, refractive multiplexer 401 comprises a sheet of material having a first index of refraction, and a substantially flat first surface 411, which receives light from pixels of pixelated array. In various elements, refractive multiplexer 401 comprises second surface comprising a repeating pattern of optical elements 415, which define shaped boundary between the sheet of material having the first index of refraction, and a medium (for example, air, or a cover layer) having a second index of refraction. The shaped boundary between regions of dissimilar indices of refraction creates a lensing effect, dividing the output of the pixelated array in three principal directions based on the point of incidence of the pixels' output with first surface 411. When repeated across the width of the pattern of refractive multiplexer, this lensing effect divides the output of the pixelated array into three directional displays, wherein each set of directional displays is associated with one or more lines of pixels which have common points of incidence on first surface relative to an optical element in the repeating pattern of optical elements. According to certain embodiments, refractive multiplexer 401 is a static multiplexer, (for example, a molded or extruded sheet of polycarbonate) wherein the shape of optical element 415 remains constant. In various embodiments, (for example, embodiments utilizing materials whose index of refraction is tunable, or embodiments utilizing fluidic lenses) the optical properties of refractive multiplexer 401 can be reconfigured.

In some embodiments, the optical multiplexer is a parallax barrier 451. As shown in FIG. 4, parallax barrier 451 comprises a set of slits (for example, slit 453) in an opaque layer, which cause selected subsets of the pixels of a pixelated array (for example, color filter 457) to be visible at selected ranges of viewing angles. In the non-limiting example shown in FIG. 4, viewers within a first range of viewing angles, the first range of viewing angles covering first viewing position 460 only see the striped pixels of color filter 457. Similarly, viewers within a second range of viewing angles, the second range of viewing angles covering second viewing position 470 only see the "white dotted" pixels of color filter 457. According to various embodiments, parallax barrier 451 is a static parallax barrier, with the widths of the slits and distance 455 to color filter 457 remaining constant. In certain embodiments, parallax barrier 451 is actuated and adjustable, with one or more of the widths of the slits or distance 455 to color filter 457 being reconfigurable.

Figure 5:
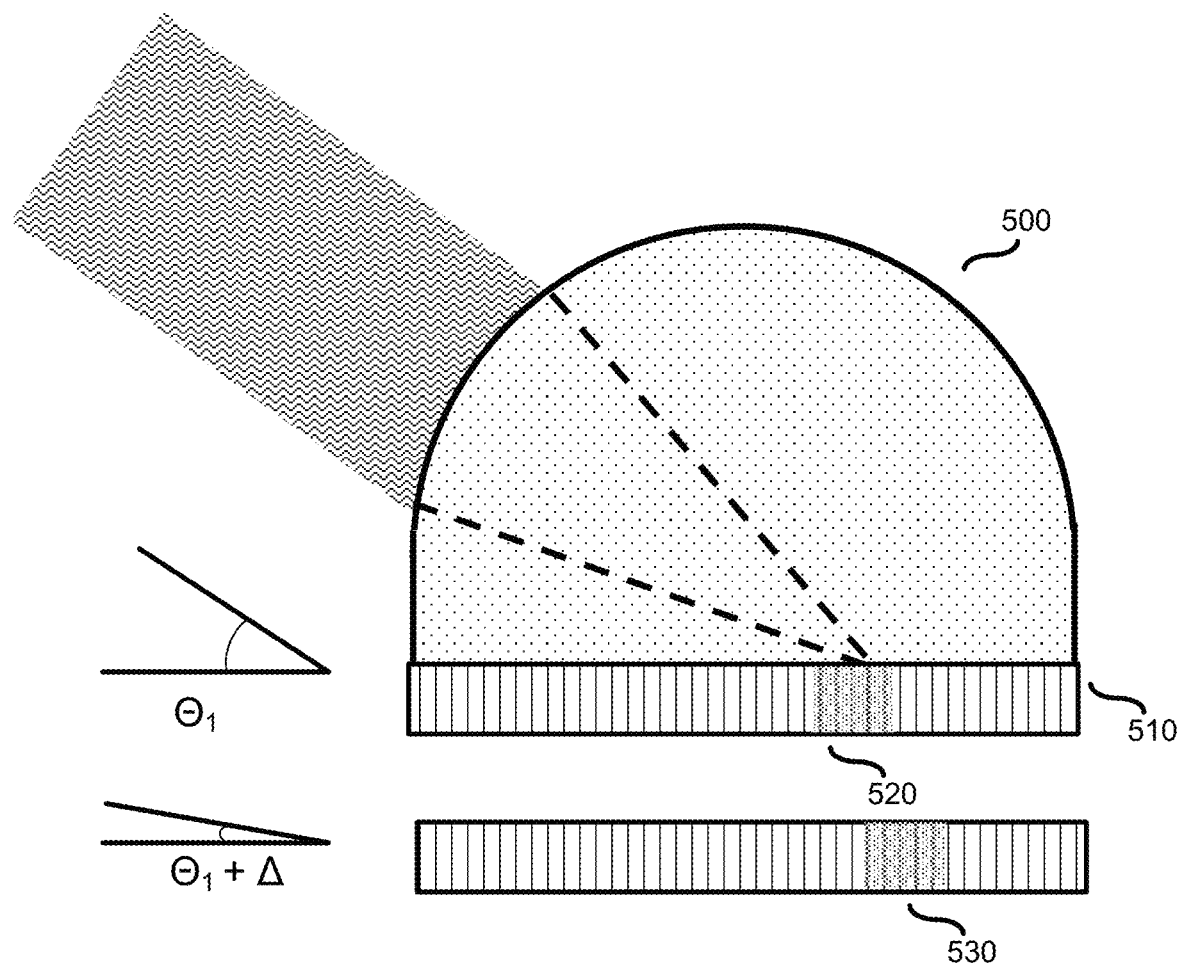
FIG. 5 illustrates aspects of a relationship between viewing angle and lateral offset in a pixelated array according to certain embodiments of this disclosure.

FIG. 5 illustrates aspects of a relationship between viewing angle and lateral offset in a pixelated array according to some embodiments of this disclosure. The embodiment shown in FIG. 5 is for illustration only and other embodiments could be used without departing from the scope of the present disclosure.

Referring to the non-limiting example of FIG. 5, an optical element 500 of an optical multiplexer is shown in cross section relative to a line of pixels 510 of a pixelated array (for example, an OLED array or color filter 310 in FIG. 3). In this non-limiting example, optical element 500 has a curved cross section, the curvature of which does not change discontinuously. Based on the geometry of optical element 500, the index of refraction of optical element 500, and other optical properties (for example, diffractive properties), of optical element 500, light from a set of pixels rendered at location 520 passes through optical element 500 such that it is primarily directed along a direction of view associated with an angle $\Theta_1$ relative to the axis defined by the line of intersection between optical element 500 and line of pixels 510.

As shown in the illustrative example of FIG. 5, if the pixels are rendered at a location 530, which is laterally offset from location 520 by two pixels, the point of incidence of the light to optical element 500 is shifted, and the light passes through optical element 500 such that it is primarily directed along a different direction of view, associated with an angle $\Theta_1+\Delta$ relative to the axis defined by the line of intersection between optical element 500 and line of pixels 510. According to various embodiments, $\Delta$, or the change in direction associated with a lateral offset in where pixels are rendered is primarily a function of the geometry of optical element 500. In this example, the exterior of optical element 500 has a smooth, continuous curve, making it an appropriate choice for certain applications (for example, generating a directional display which follows a tracked user as she moves through a room). For other applications, a prismatic cross section for optical element 500 may be appropriate (for example, multi-user gaming applications where enforcing a separation between multiple directional views between users may be a priority).

Figure 6:
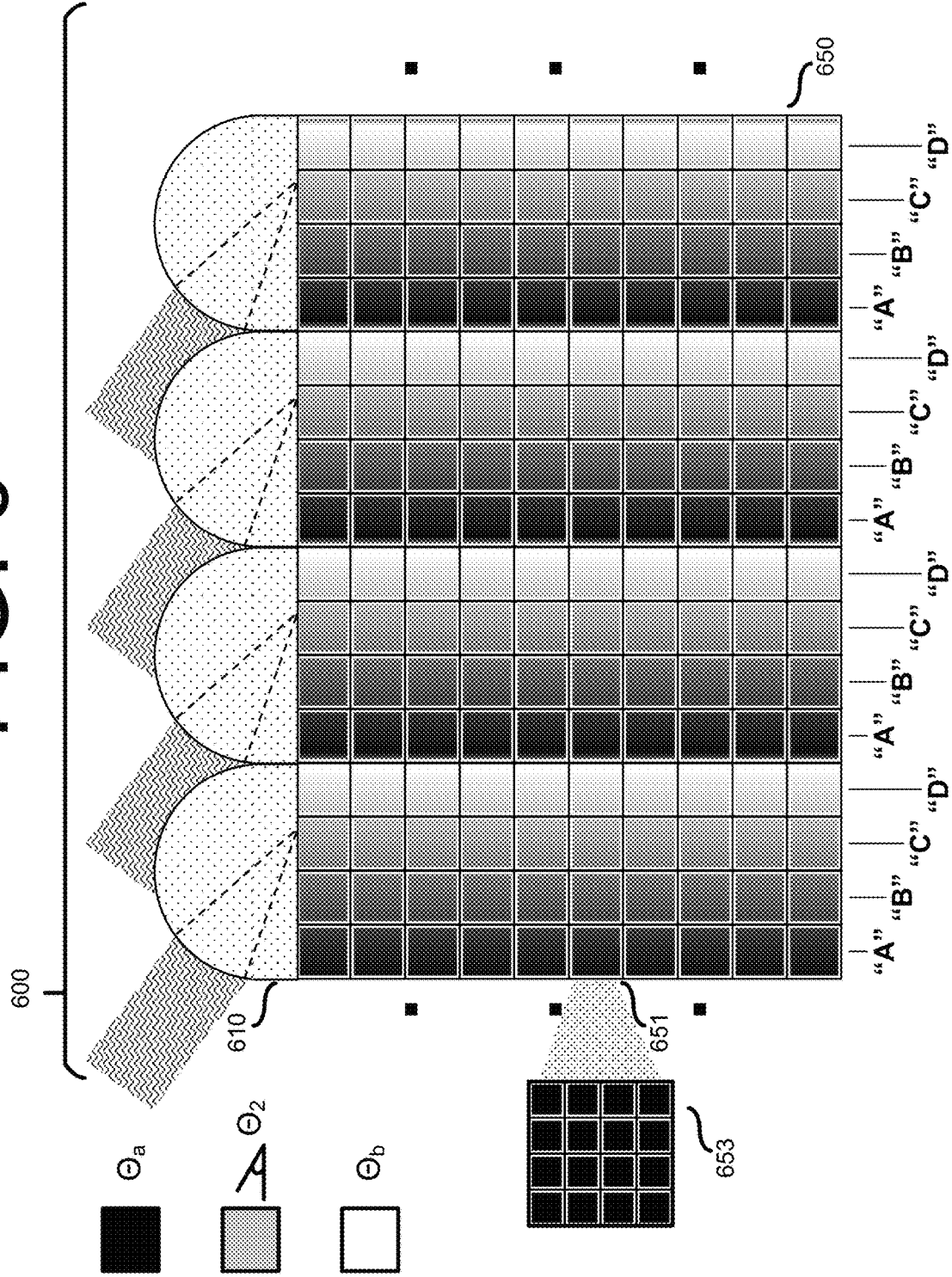
FIG. 6 illustrates aspects of a relationship between viewing angle and lateral offset according to various embodiments of this disclosure.

FIG. 6 illustrates aspects of a relationship between viewing angle and lateral offset according to certain embodiments of this disclosure. The embodiment shown in FIG. 6 is for illustration only and other embodiments could be used without departing from the scope of the present disclosure.

In the non-limiting example shown in FIG. 6, a section of an optical multiplexer 600 is depicted relative to a section of a pixelated array 650. For the purposes of clarity, while only the cross section of optical multiplexer 600 is shown in FIG. 6, extrusions of the cross section of optical multiplexer cover the pixels of pixelated array 650 in parallel with the orthogonal grid of pixelated array 650.

According to certain embodiments, optical multiplexer 600 comprises a repeating pattern of optical elements (for example, refractive optical element 610 6). In the non-limiting example of FIG. 6, the optical elements of optical multiplexer 600 have substantially optical properties determined by, for example, their width, cross section, and the index of refraction of the materials from which they are constructed).

In some embodiments, pixelated array 650 comprises an orthogonal grid of pixels (for example, pixel 651) of a color filter or OLED array which provides light at selected points of incidence on a flat side of optical multiplexer 600. According to various embodiments, both the optical elements of optical multiplexer 600 and the pixels of pixelated array 650 repeat at regular intervals to each other. In the illustrative example of FIG. 6, the pixel pattern repeats at four times the spatial frequency of the pattern of optical elements of optical multiplexer 600. Accordingly, each element of optical multiplexer 600 (for example, optical element 610) contacts four pixels of pixelated array 650 along an axis perpendicular to the grain of pixelated array 650.

As discussed with reference to FIG. 5, the point of incidence of light from a pixel relative to the cross section of an optical member of an optical multiplexer is, in certain embodiments, primarily determinative of the direction in which light from the pixel will be directed by the optical member. In the illustrative example of FIG. 6, the darkness of gradient shading within pixelated array 650 indicates the angle at which light is emitted from optical multiplexer 600. As shown in the example of FIG. 6, light exits optical multiplexer 600 across a range of angles between $\Theta_a$ (the leftmost emission angle, shown as the darkest shading gradient) and $\Theta_b$ (the rightmost emission angle, shown as the lightest shading gradient).

In certain embodiments, the regularity with which pixel pattern repeats relative to the pattern of optical elements of an optical multiplexer allows for the identification of groups of pixels associated with specific viewing angles or ranges of viewing angles. For example, light from the group of pixels comprising the lines of pixels marked "C" is emitted from optical multiplexer 600 across a range of angles which includes viewing angle $\Theta_2$, with viewers along viewing angle $\Theta_2$, primarily receiving light from the lines of pixels marked "C". Depending on, without limitation, the geometry of the optical elements of the optical multiplexer, the association between the light received at a particular viewing angle and specific groups (for example, lines) of pixels can be adjusted, variously producing strongly or subtly directional displays. Further, depending on, for example, the geometry of the elements of optical multiplexer and the resolution of pixelated array 650, the groups of pixels associated with a given direction may comprise multiple lines of pixels, as shown by callout 653, showing the association with viewing angle $\Theta_2$, relative to a pixelated array having sixteen times the resolution of pixelated array 650.

Figure 7:
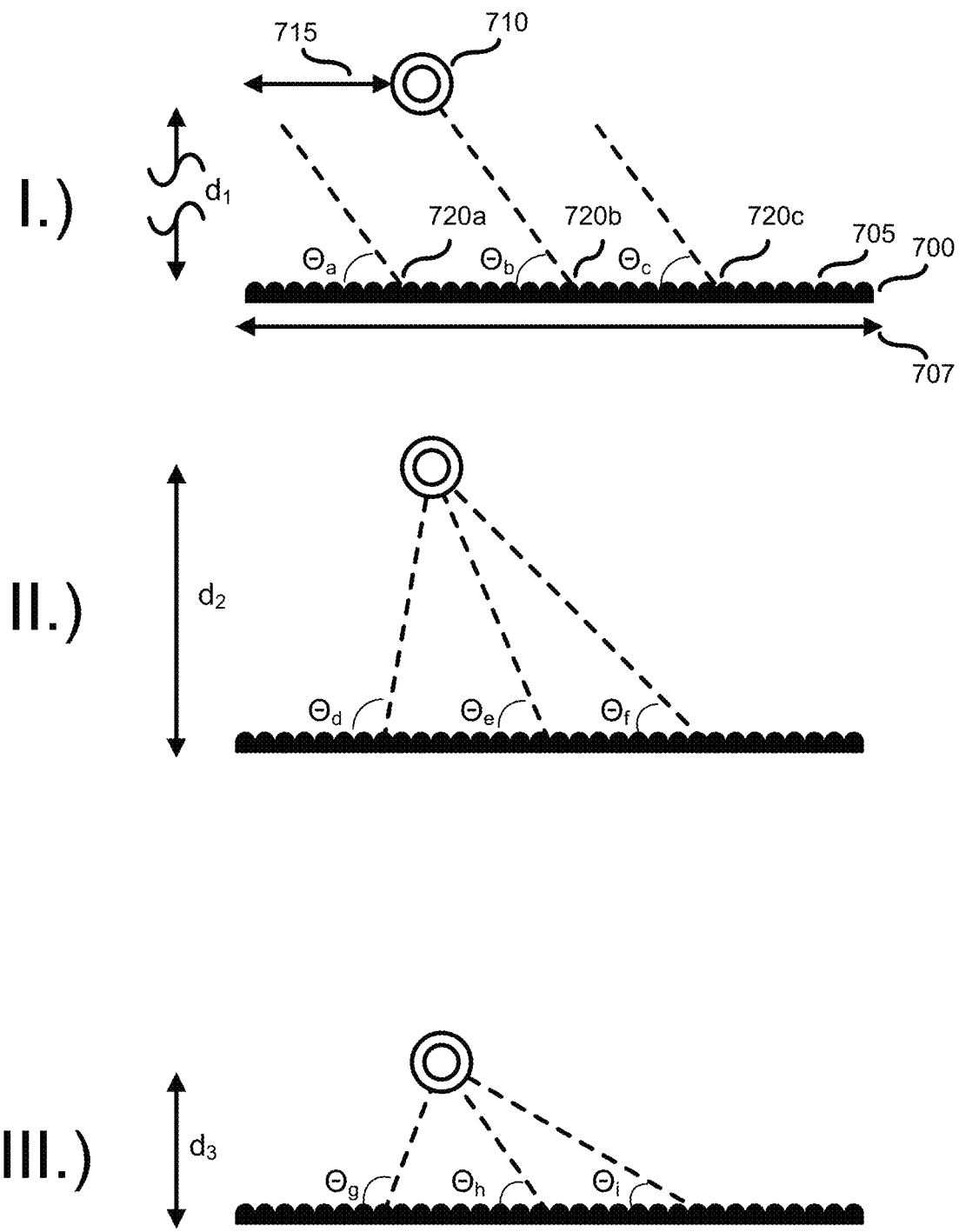
FIG. 7 illustrates aspects of relationships between the directionality of displayed pixels and viewing distance according to some embodiments of this disclosure.

FIG. 7 illustrates aspects of relationships between the directionality of displayed pixels and viewing distance according to certain embodiments of this disclosure. The embodiments shown in FIG. 7 are for illustration only and other embodiments could be used without departing from the scope of the present disclosure.

Referring to the non-limiting example of FIG. 7, three representations (designated "I.)", "II.)" and "III.)" of a viewpoint 710 relative to a multi-user display 700 having an optical multiplexer 705 and width 707, are provided. According to some embodiments, optical multiplexer 705 comprises a lenticular array. In various embodiments, optical multiplexer 705 comprises a parallax barrier. In each of the three explanatory representations provided in FIG. 7, viewpoint 710 is disposed at a position relative to multi-user display 700 associated with a viewing distance from multi-user display 700, and a lateral offset 715 relative to a reference point of multi-user display. In each of the three representations, the value of lateral offset 715 remains the same. However, embodiments according to this disclosure are not so limited, and the relationships between directionality and viewing distance can be applied to directionality and lateral offset.

According to certain embodiments, multi-user display 700 is providing a directional display to viewpoint 710, wherein the directional display comprises three pixels (or sub-pixels) 720a, 720b and 720c, which are rendered to have a specific directionality, expressed by the angle $\Theta_n$, relative to multi-user display 700. In various embodiments according to this disclosure, the directionality of pixels 720a, 720b and 720c is controlled by rendering the pixels in a way that allows the point of incidence between the rendered pixels and a structure of the optical multiplexer (for example, a lenticle) to be changed, thereby changing the directionality of the pixel as displayed by multi-user display.

As shown in the representation of multi-user display 700 and viewpoint 710 designated "I" in FIG. 7, viewpoint 710 is disposed at a viewing distance $d_1$ relative to multi-user display 700. In this non-limiting example, pixel (or sub-pixel) 720a is rendered to have a directionality corresponding to angle $\Theta_a$ relative to multi-user display 700. Similarly, pixel (or sub-pixel) 720b is rendered to have a directionality corresponding to angle $\Theta_b$ relative to multi-user display 700, and pixel (or sub-pixel) 720c is rendered to have a directionality $\Theta_c$ relative to multi-user display 700.

In this explanatory example, the length of $d_1$ is significantly greater than width 707 of multi-user display 700. According to certain embodiments, given the relative sizes of $d_1$ to width 707, a display provided by multi-user display 700 can be directed at viewpoint 710 by rendering content such that each of the pixels (in certain embodiments, only a fraction of the total pixels of multi-user display 700 may are used to provide one display) used to direct the display to viewpoint 710 are rendered to have the same directionality (e.g., $\Theta_a = \Theta_b = \Theta_c$). Put differently, the outputs of each of pixels 720a, 720b and 720c are configured to focus at an infinite focal distance, rather than specifically converge on viewpoint 710.

Referring again to the non-limiting example of FIG. 7, a second representation ("II.)") of viewpoint 710 relative to multi-user display 700 is shown. In this example, viewpoint 710 is disposed at a viewing position associated with a viewing distance $d_2$, wherein $d_2 < d_1$. In this illustrative example, the values of d2 relative to width 707 are such that, for the output of each of pixels (or subpixels) 720a, 720b and 720c to be directed at viewpoint 710, the directionality of each pixel's output must be adjusted to account for the pixel's location within multi-user display 700. Thus, in contrast to representation "I." of FIG. 7, wherein a display from multi-user display 700 can be directed at viewpoint 710 by rendering each of pixels (or sub-pixels) 720a, 720b and 720c at the same, or substantially the same value of $\Theta_n$. Thus, in the representation numbered "II.)" in FIG. 7, pixels 720a, 720b and 720c are rendered to have different directionalities (e.g., $\Theta_d \neq \Theta_e \neq \Theta_f$). Put differently, in the representation designated "II.)", the outputs of each of pixels (or sub-pixels) 720a, 720b and 720c "focus" or converge upon viewpoint 710 at viewing distance $d_2$.

The explanatory example of FIG. 3 includes a third representation, designated "III.)" of viewpoint 710 relative multi-user display 700. In this example, viewpoint 710 is disposed at a viewing position associated with a viewing distance $d_3$, wherein $d_3 < d_2 < d_1$. As the ratio of the viewing distance to width 707 of multi-user display 700 decreases, the relative amount of adjustment of the directionality of the output across pixels (or sub-pixels) 720a, 720b and 720c to direct a display at viewpoint 710 increases. Thus, in the representation marked "III.)", not only is it the case that $\Theta_g \neq \Theta_h \neq \Theta_i$, but also that $(\Theta_g - \Theta_h) > (\Theta_d - \Theta_e)$ and $(\Theta_i - \Theta_h) > (\Theta_f - \Theta_e)$.

According to certain embodiments, the relationships between viewing distance and directionality of pixel output described with reference to the non-limiting examples provided in FIG. 7, can be leveraged to control the visibility of the output of multi-user display 700 across predetermined regions of a field of view of multi-user display 700. For example, the range of locations at a given viewing distance which a directional display provided by multi-user display 700 can be tuned by, for example, adjusting the difference between the extent to which the directionality of each of pixels 720a, 720b and 720c "focus" or converge upon viewpoint 710. In some embodiments, ensuring that pixels 720a, 720b and 720c are visible at viewpoint 710 comprises, a visibility criterion associated with a viewing context. Further, in certain embodiments according to this disclosure, visibility criteria associated with a viewing context can be negative criteria. For example, for a viewing context associated with providing a private display, a first viewing criterion is that the output of pixels (or sub-pixels) 720a, 720b and 720c be visible at viewpoint 710, and a second viewing criterion is that the output of pixels (or sub-pixels) not be visible (or differently visible than at viewpoint 710) at positions in a field of view of multi-user display 700 which are located away from viewpoint 710.

Figure 8:
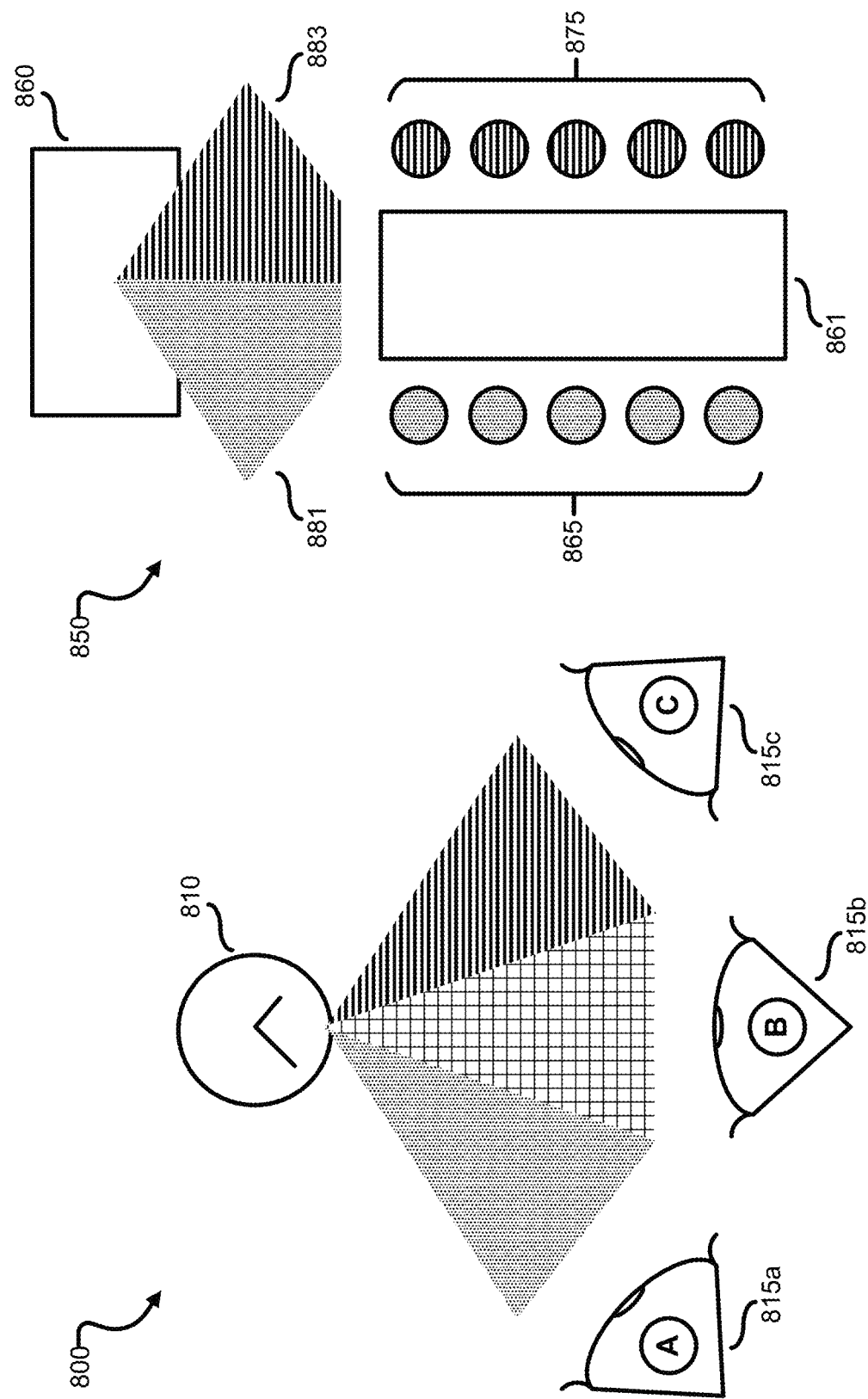
FIG. 8 illustrates two examples of rendering content at a multi-user display to satisfy visibility criteria associated with viewing contexts according to certain embodiments of this disclosure.

FIG. 8 illustrates two examples of rendering content to satisfy visibility criteria associated with a particular viewing context according to various embodiments of this disclosure. The examples shown in FIG. 8 are for illustration only and other examples could be used without departing from the scope of the present disclosure.

Referring to the non-limiting illustration of FIG. 8, a first example 800 of content being rendered to meet the visibility criteria associated with a viewing context is shown. In example 800, a multi-user display 810 is provided as part of a wall-mounted "smart clock" 810. According to various embodiments, "smart clock" 810 comprises a networked device (for example, multi-user display 200 in FIG. 2, or an internet of things ("IoT") hub) with the form factor and appearance of a wall clock. In this illustrative example, the viewing context is an office environment occupied by both registered and unregistered viewers. The visibility criteria associated with the viewing context of first example 800 include providing each registered viewer with a directional display comprising personalized content, and providing unregistered viewers with a display comprising publicly viewable display comprising non-personalized content.

In first example 800, a registered viewer designated "A" is associated with a viewpoint 815a in a field of view of multi-user display 810. Similarly, a registered viewer "B" is associated with a viewpoint 815b in the field of view of multi-user display 810, wherein viewpoint 815b is physically distinct from viewpoint 815a and associated with a different viewing angle of multi-user display 810 than viewpoint 815a. Additionally, an unregistered viewer "C" is associated with a viewpoint 815c, which is physically distinct from viewpoints 815a and 815b, and associated with a separate viewing angle.

According to certain embodiments, multi-user display 810 determines each of viewpoints 815a, 815b, and 815c to be controlled viewpoints. As used in the context of this disclosure, the term "controlled viewpoint" encompasses a viewpoint, or position in a field of view of multi-user display 810, where content is rendered to satisfy a visibility criterion. In some embodiments, one or more of viewpoints 815a, 815b and 815c is determined by multi-user display 810 recognizing one or more of viewers "A", "B" and "C" and their positions within a field of view of the multi-user display 810 based on data from a sensor (for example, field sensor 360 in FIG. 3). In various embodiments according to this disclosure, viewpoints 815a, 815b and 815c are determined to be controlled viewpoints based on a signal from one or more devices associated with one or more of viewers "A", "B" or "C." For example, viewer "B"'s smart watch transmits a signal to multi-view display 800, the signal containing information associating the watch with a location in the field of view of multi-user display 810, and viewer "B." In various embodiments, that one or more of viewpoints 815a, 815b and 815c are controlled viewpoints is predetermined by multi-user display 800. As noted above, in first example 800, multi-user display 810 is part of a wall-mounted clock, and the viewing context is an office through which registered and unregistered viewers pass. Accordingly, given the viewing context, viewpoints may be mapped to coordinates within the office. For example, viewpoint 815a may be associated with viewer "A's" desk in an office.

In certain embodiments according to this disclosure, after determining viewpoints 815a, 815b and 815c to be controlled viewpoints of multi-user display 810, content to be displayed at each of viewpoints 815a, 815b, 815c according to one or more visibility criteria, is determined. For example, one visibility criterion associated with the viewing context may be that viewer "A's" calendar information can only be visible to viewer "A." Thus, in certain embodiments, after determining viewpoint 815a to be a viewpoint associated with registered viewer "A," content from viewer "A's" calendar is determined as content to be displayed to viewpoint 815a. As a further example, a second visibility criterion may be to not show unregistered viewers calendar information, and to instead only show such viewers non-confidential information. Accordingly, after determining viewpoint 815c to be a controlled viewpoint associated with unregistered viewer "C," the pixel control logic (for example, pixel control logic 230 in FIG. 2) determines time and date related content (for example, a scenic photo with clock hands superimposed on it) as content to be displayed to viewpoint 815c.

In various embodiments, having determined content satisfying visibility criteria associated with one or more viewpoints 815a, 815b and 815c, multi-user display 810 determines one or more subsets of pixels (or sub-pixels) of a pixelated array of multi-user display 810 whose visibility satisfies the visibility criteria associated with viewpoints 815a, 185b and 815c. According to some embodiments, the determination of pixels which are visible at specified viewpoints is performed based on a predetermined mapping of pixels of a pixel array to viewing angles (for example, pixel groupings "A," "B," "C," and "D" shown in FIG. 6). According to some embodiments, determining the directionality of the pixels providing content to a controlled viewpoint is determined dynamically by the pixel control logic of multi-user display 810 based on, for example, information regarding a viewing distance associated with the controlled viewpoint, a lateral offset associated with the controlled viewpoint, a slant (referring to an angular offset between the axes of repetition of a pixel pattern relative to the axes of repetition of the optical features, such as lenticles, of an optical multiplexer), the pitch of the optical multiplexer and the pitch of the pixelated array of multi-user display 810.

Further, in certain embodiments according to this disclosure, after determining the subsets of pixels required to provide a directional display at each of viewpoints 815a, 815b and 815c, multi-user display 810 (or a device communicatively connected thereto) renders content to be displayed on each of the determined subsets of a pixelated array of multi-user display 810.

Referring to the non-limiting example of FIG. 8, a second example 850 of rendering content to satisfy visibility criteria associated with a viewing context, according to various embodiments of this disclosure. In this illustrative example, a viewing context associated with a meeting is shown, with a multi-user display 860 disposed at one end of a space comprising a table 861, at which a first set of five viewers 865 is disposed on one side, and a second set of five viewers 875 is disposed on another side. In this example, multi-user display 860 displays first content 881 to first set of viewers 865 and second content 883 to second set of viewers 875.

According to certain embodiments, multi-user display 860 determines at least two controlled viewpoints for the viewing context. In some embodiments according to this disclosure, the visibility criterion associated with the viewing context requires that certain content be visible at the determined viewpoint, wherein the control logic (for example, pixel control logic 230 in FIG. 2) for the multi-user display models the determined viewpoint as a single point in a field of view of the multi-user display. In some embodiments, the control logic models the determined viewpoint as either a set of multiple points, or a defined area within a field of view of the multi-view display.

Referring to the non-limiting example of FIG. 8, according to certain embodiments, multi-user display 860 determines a region of the field of view of multi-user display 860 comprising all five viewers of first set of viewers 865 as a first controlled viewpoint, and a region of the field of view of multi-user display comprising all five viewers of second set of viewers 875 as a second controlled viewpoint.

According to certain embodiments, multi-user display 860 determines a subset of pixels whose visibility satisfies a visibility criterion (for example, being visible at a predetermined degree of sharpness) at the controlled viewpoint associated with the first set of viewers 865. In this illustrative example, the directionality of the output of the pixels of multi-user display 860 providing first content 881 to each viewer first set of viewers 865 may be selected to ensure that first content 881 is fully visible to each viewer within first set of viewers 865. For example, instead of configuring the directionality of the pixels' output to converge on a single point (for example, as shown in representation "III." in FIG. 7), the pixels' output may be configured to have a parallel directionality (for example, as shown in representation "I." in FIG. 7), or configured to converge at a point beyond the viewers in first set of viewers 865.

Figure 9:
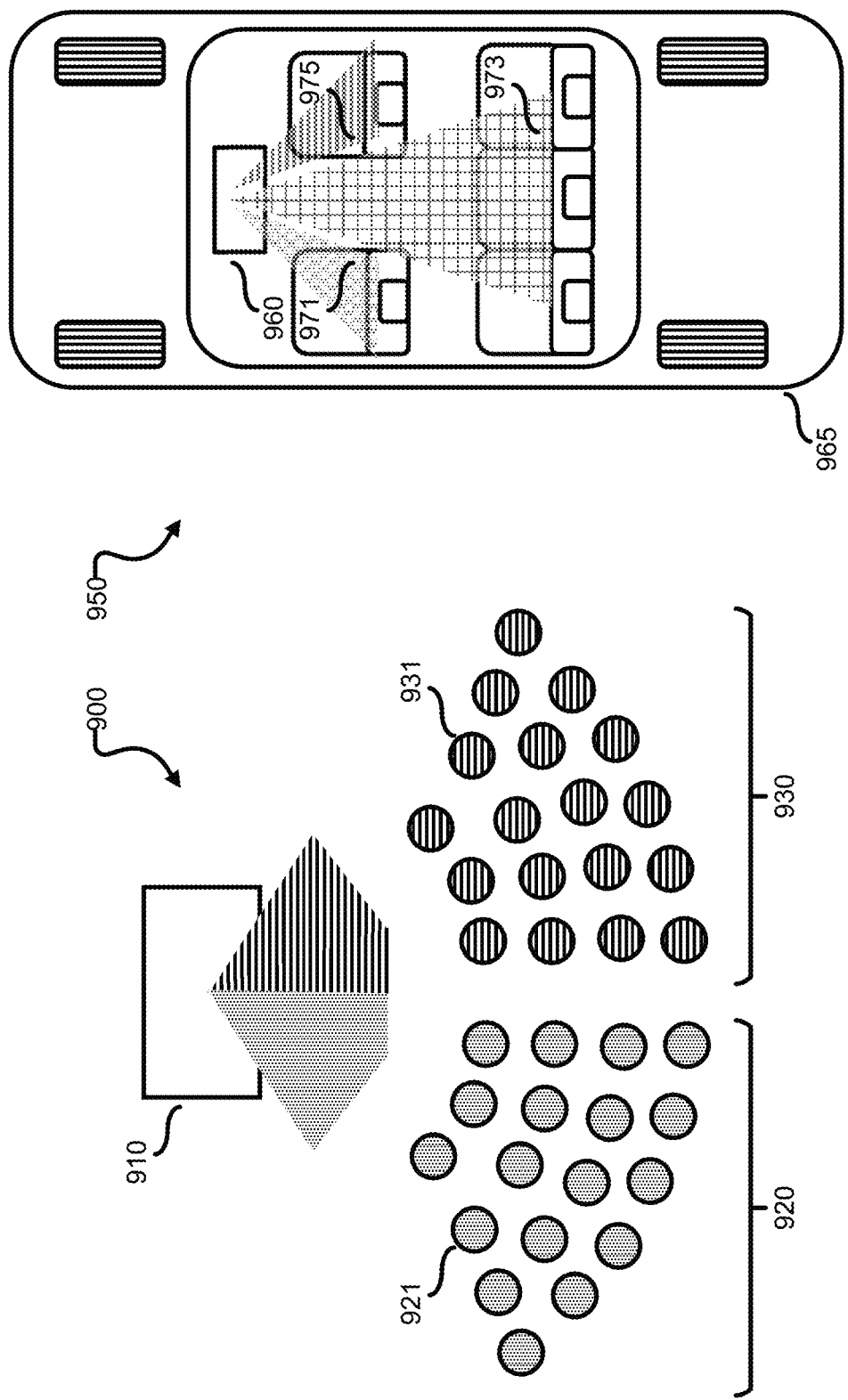
FIG. 9 illustrates two examples of rendering content at a multi-user display to satisfy visibility criteria associated with viewing contexts according to some embodiments of this disclosure.

FIG. 9 illustrates two examples of rendering content to satisfy visibility criteria associated with viewing contexts according to some embodiments of this disclosure. The examples shown in FIG. 9 are for illustration only and other examples could be used without departing from the scope of the present disclosure.

Referring to the non-limiting examples of FIG. 9, a first example 900 is shown on the left side of the figure. First example 900 provides a representation of a viewing context associated with providing visual content to sections of a crowd at a stadium event (for example, a football or basketball game) via a large (for example, JUMBOTRON-sized) multi-user display 910. The visibility criteria associated with first example 900 comprise a requirement that a first set of viewers 920 (for example, fans seated in a "home fans" section of a venue) see first content 921, and a second set of viewers 930 (for example, fans seated in a "visiting fans" section of the venue) see second content 931. According to certain embodiments, in first example 900, the viewpoints associated with first set of viewers 920 and second set of viewers 930 are predetermined based on extrinsic information provided to multi-user display 910. For example, recognizing the variability of event attendee demographics (e.g., fans of a faraway team may be less likely to travel to an away game) the viewpoints associated with second set of viewers 930 may be determined based on one or more of ticket sale data, or an analysis of colors found image data (for example, data collected by field sensor 210 in FIG. 2) within the venue. To the extent fans' clothing choices (e.g., wearing team) colors is a reasonably proxy for content of interest, in certain embodiments, the pixel control logic (for example, pixel control logic 230 in FIG. 2) determines one or more controlled viewpoints based on color data from the field of view of multi-user display 910.

Referring to the non-limiting examples of FIG. 9, a second example 950 of rendering content to satisfy visibility criteria associated with a particular viewing context is provided.

According to certain embodiments, visibility criteria can be negative visibility criteria, and there may also be a hierarchical relationship between the visibility criteria associated with a viewing context. As used in this disclosure, the term "negative visibility criterion" encompasses a requirement as to how a directional display is not visible at a given controlled viewpoint. Further, as used in this disclosure, the term "hierarchical relationship between visibility criteria" encompasses the idea that, given the viewing context, it is more important to satisfy one or more visibility criteria associated with the viewing context.

Referring to non-limiting second example 950, a multi-user display 960 is provided in the interior (for example, as a touchscreen display in the dashboard or center console) of a vehicle 965. In certain embodiments, vehicle 965 includes a first viewpoint 971 associated with a driver's seat, a second viewpoint 973 (or set of viewpoints) associated with one or more locations along a rear passenger seat, and a third viewpoint 975 associated with a front passenger seat. Accordingly, most, if not all, of the possible viewing contexts of multi-user display 960 include a driver located at first viewpoint 971. Given the importance of preserving the driver's focus while operating a moving vehicle, in certain embodiments, multi-user display 960 renders content to be displayed (or not displayed) at each of viewpoints 971, 973 and 975, such that a requirement that content to be displayed to second viewpoint 973 and third viewpoint 975 not be visible at first viewpoint 971. According to certain embodiments, the resolution (or other metric of picture quality) of content (for example, a movie viewed from second viewpoint 973, and a web browser viewed from third viewpoint 975) viewed at second viewpoint 973 and third viewpoint 975 may be less than a theoretical optimum, to avoid rendering the content in a way that creates distracting displays at first viewpoint 971.

Figure 10:
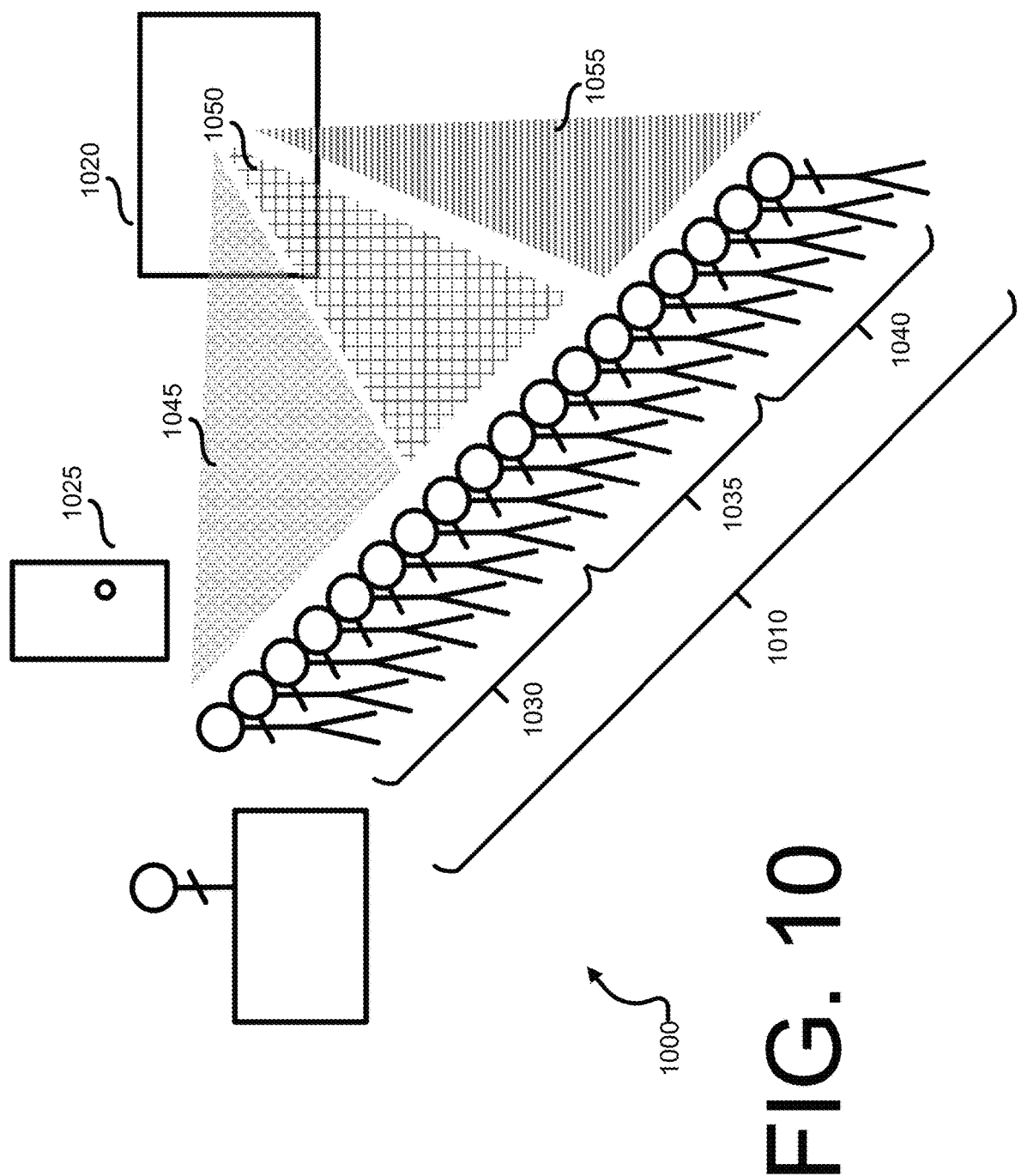
FIG. 10 illustrates an example of rendering content at a multi-user display to satisfy visibility criteria associated with a viewing context according to various embodiments of this disclosure.

FIG. 10 illustrates an example of rendering content to satisfy visibility criteria associated with a viewing context 1000, according to various embodiments of this disclosure. The embodiment shown in FIG. 10 is for illustration only and other embodiments could be used without departing from the scope of the present disclosure.

Referring to the non-limiting example of FIG. 10, viewing context 1000 comprises a line of viewers 1010 waiting to pass through a door 1025 (for example, at a gate for an airline flight which is in the process of boarding). According to various embodiments, multi-user display 1020 provides multiple displays to satisfy visibility criteria associated with viewpoints in line of viewers 1010.

In certain embodiments, multi-user display 1020 determines one or more viewpoints within region of a field of view of multi-user display 1020 as controlled viewpoints. According to certain embodiments (for example, an airport boarding area with signage or other interior landmarks indicating passenger boarding numbers), the controlled viewpoints may be hard-coded or otherwise predetermined based on the interior landmarks (for example, a first controlled viewpoint) associated with a region in which the first fifteen passengers wait to board. In some embodiments, the controlled viewpoints may be determined based on facial recognition, or through information obtained from devices (for example, a mobile terminal with an electronic boarding pass may provide multi-user display 1020 with information about its position) associated with viewer positions.

According to certain embodiments, having determined two or more controlled viewpoints, multi-user display 1020 determines content for each of the controlled viewpoints. In the illustrative example of FIG. 10, multi-user display 1020 determines three viewpoints as controlled viewpoints, the three controlled viewpoints comprising a first viewpoint 1030 associated with the front of line 1010, a second viewpoint 1035 associated with the middle of line 1010, and a third viewpoint 1040 associated with the end of line 1010. In the illustrative example of FIG. 10, multi-user display 1020 determines first content 1045 (for example, a seat assignment for a currently boarding passenger) for first viewpoint 1030, second content 1050 (for example, an estimate of time to board) for second viewpoint 1035 and third content 1055 (for example, an advertisement for other destinations served by an airline) for third viewpoint 1040.

Figure 11:
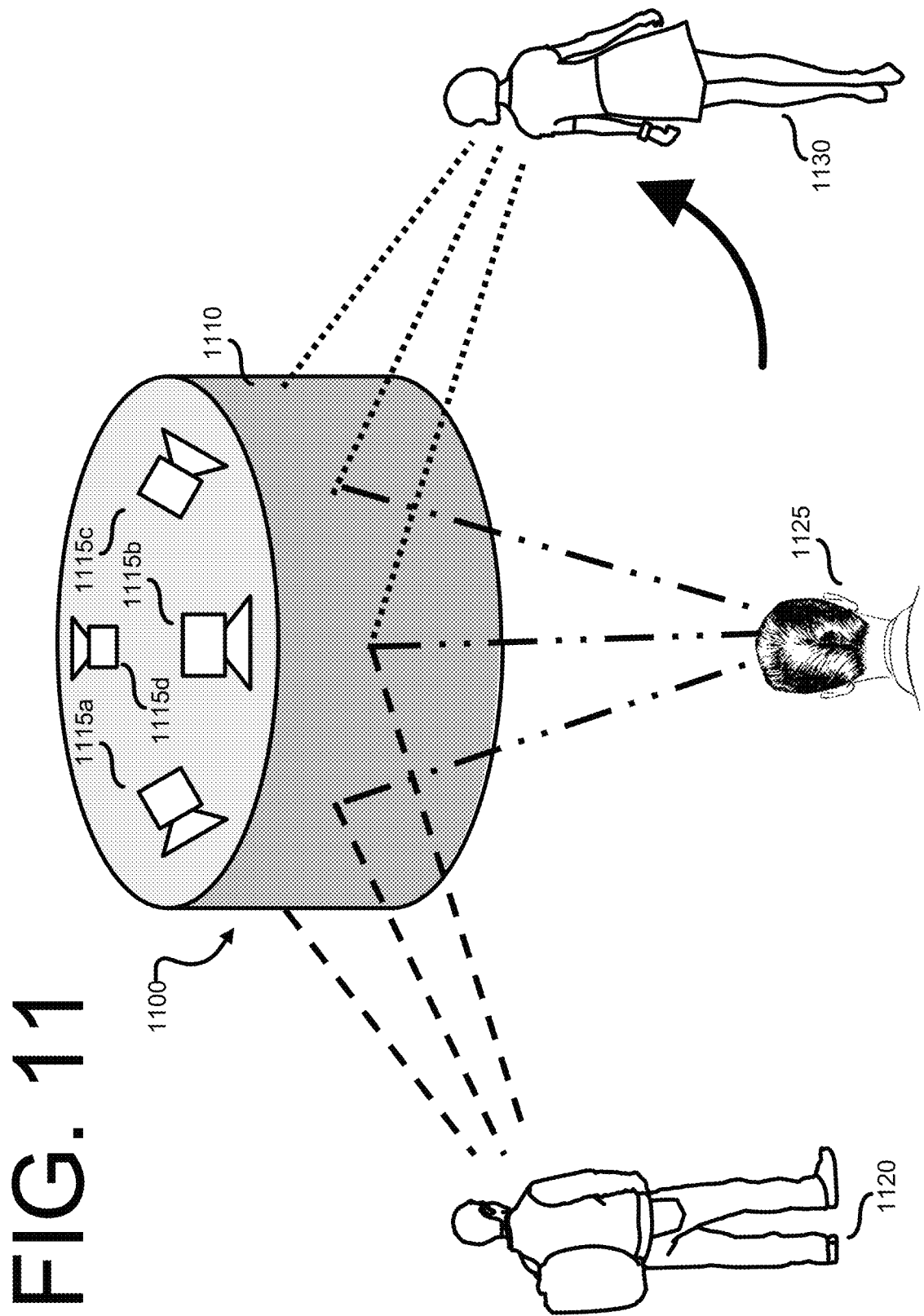
FIG. 11 illustrates an example of content selected and rendered for display at a multi-user display based on a visibility criterion and viewing context according to some embodiments of this disclosure.

FIG. 11 illustrates an example of a cylindrical, user-tracking multi-user display according to certain embodiments of this disclosure. The embodiment of the multi-user display shown in FIG. 11 is for illustration only and other embodiments could be used without departing from the scope of the present disclosure.

Referring to the non-limiting example of FIG. 11, a cylindrical, user-tracking multi-user display 1100 is shown. According to various embodiments, user-tracking multi-user display 1100 comprises one or more curved display panels comprising a curved array of pixels disposed beneath a curved optical multiplexer, the optical elements of which repeat along the circumference of multi-user display 1100. Additionally, according to various embodiments, multi-user display 1100 comprises a plurality of field sensors (for example, field sensor 360 in FIG. 3), including field sensors 1115a, 1115b, 1115c and 1115d. In certain embodiments, field sensors 1115a through 1115d identify and track the movement of viewers (for example, first male viewer 1120, second male viewer 1125 and first female viewer 1130) relative to multi-user display 1100. According to certain embodiments, multi-user display 1100 performs facial recognition of viewers based on data obtained from field sensors 1115a through 1115d and presents, for each identified viewer, a directional display satisfying one or more visibility criteria associated with a viewpoint determined for the viewer. According to some embodiments, multi-user display 1100 does not perform facial recognition (for example, due to privacy concerns), but rather, recognizes and associates unique features to each viewer to facilitate tracking. For example, in one embodiment, multi-user display 1100 identifies first male viewer 1120 as a "male with backpack" or first female viewer 1130 as a "female with yellow shirt." As shown in the non-limiting example of FIG. 11, multi-user display 1100 tracks a viewpoint associated with a current position of each of viewers 1120, 1125 and 1130 and renders content to satisfy visibility criteria determined based on positions associated with the positions of viewers 1120, 1125 and 1130, as well as viewing context. As viewers move relative to multi-user display 1100, the display renders content associated with one or more determined viewpoints to make the directional display follow the moving viewer. In some embodiments, as an alternative to tracking viewers, multi-user display 1100 directs directional displays to predetermined viewpoints. For example, viewers facing a north side of multi-user display 1100 could be presented with content regarding attractions to the south.

FIG. 12 illustrates an example of content selected and rendered for display on a multi-user display based on a visibility criterion and a viewing context according to some embodiments of this disclosure. The example shown in FIG. 12 is for illustration only and other examples could be used without departing from the scope of the present disclosure.

Referring to the non-limiting example of FIG. 12, a multi-user display 1210 is provided (for example) as part of a shop window. According to certain embodiments, multi-user display 1210 is a transparent display (for example, a display operating according to the same or similar principles as a heads-up display) wherein the output of a pixelated array is projected onto a substantially transparent viewing surface (for example, a sheet of glass). According to certain embodiments, an optical multiplexer (for example, a lenticular sheet) is placed in front of the substantially transparent viewing surface to impart controllable directionality to the images projected onto the viewing surface. In some embodiments, multi-user display 1210 further comprises a field sensor (for example, field sensor 210 in FIG. 2) for obtaining data (such as image data) from a field of view of multi-user display 1210.

As shown in the illustrative example of FIG. 12, as both a transparent and directional display, multi-user display 1210 can be configured to, without limitation, appear as a mirror from a first viewpoint, and as a transparent member (e.g., a window) from viewpoints other than the first viewpoint. FIG. 12 illustrates some embodiments of a multi-user display 1210 implementing such functionality. In this explanatory example, multi-user display 1210 tracks subjects (for example, from image data received from a field sensor) in a field of view of the multi-user display, and determines positions of the subjects. For example, multi-user display 1210 tracks viewer 1220 as she passes in front of multi-user display 1210. In some embodiments, for viewers whose position, movement (for example, stopping in front of multi-user display 1210 for a predetermined time), or viewer indicia (for example, image data identifying the tracked viewer as belonging to a demographic of interest—such as women looking to purchase clothing) satisfying one or more requirements, multi-user display 1210 determines content to display to the viewer. According to various embodiments, multi-user display 1210 is a touchscreen display, and the determination of content to display to the viewer is performed in response to an input provided by viewer 1220, such as, for example, touching a predetermined region of multi-user display 1210. Returning to the example of FIG. 12, in this example, multi-user display 1210 has determined a viewpoint for viewer 1220, and based on, for example, tracking and image data indicating that viewer 1220 is a woman who has stopped in front of the shop window comprising multi-user display 1210, multi-user display 1210 determines and renders content to provide a directional display to the viewpoint associated with viewer 1220. In this example, multi-user display 1210 provides content comprising a composite of the woman's head and image data comprising a different set of clothes matched to her current pose and posture. By rendering the content to provide a directional display, multi-user display 1210 provides a "magic mirror" effect, wherein the projected image appears to viewer 1220 to "move" in the same way as a reflection from an actual mirror. Further, given the directionality of the content provided to viewer 1220 and the transparency of the viewing member (for example, a sheet of glass), multi-user display 1210 can appear to be a transparent window at viewpoints away from the viewpoint occupied by viewer 1220, thereby preserving viewer 1220's privacy.

Figure 13A:
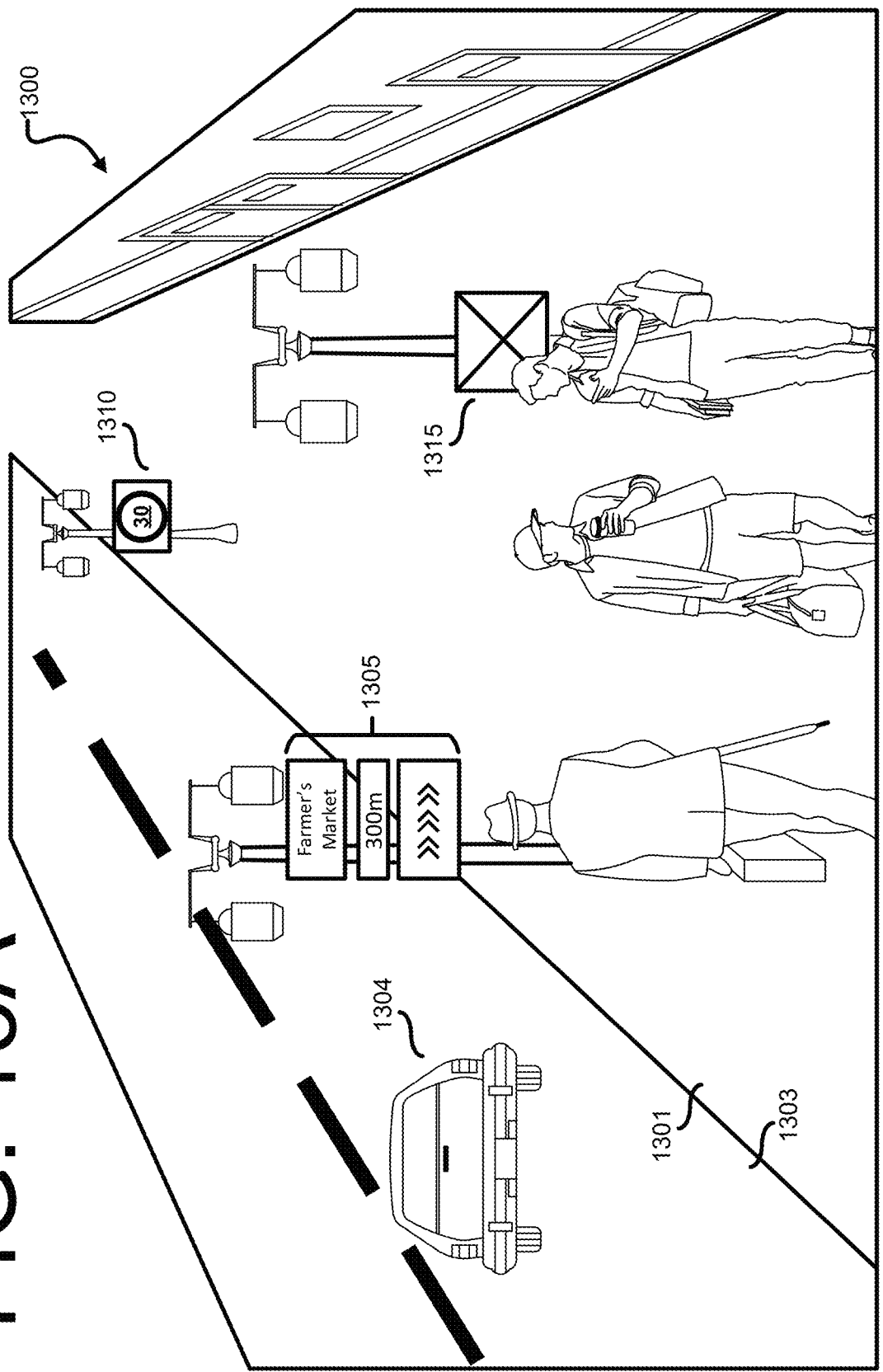
FIGS. 13A and 13B illustrate an example of content selected and rendered for display at a multi-user display based on a visibility criterion and viewing context according to various embodiments of this disclosure.
Figure 13B:
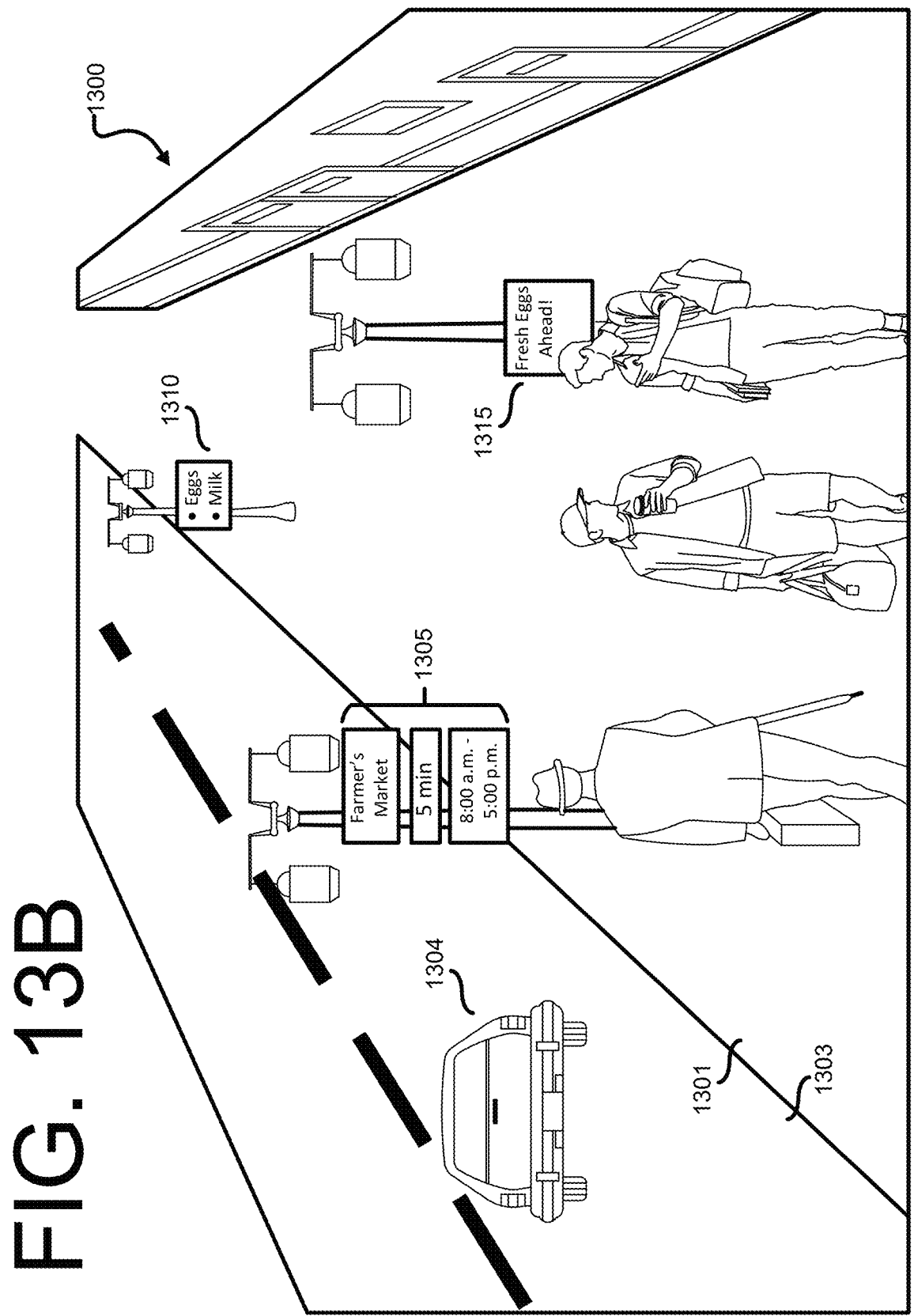

FIGS. 13A and 13B illustrate an example of content selected and rendered for display on a plurality of multi-user screens based on visibility criteria and viewing context according to various embodiments of this disclosure. The examples shown in FIGS. 13A and 13B are for illustration only and other examples could be used without departing from the scope of the present disclosure.

Referring to the non-limiting example of FIG. 13A, a first view of a street scene 1300 is shown. According to certain embodiments, street scene 1300 comprises a sidewalk 1301, a two-lane street 1303 for cars and bicycles (including, for example, automobile 1304), a cluster of multi-user displays 1305, multi-user display 1310 and multi-user display 1315. In various embodiments, each cluster of multi-user displays 1305, multi-user display 1310 and multi-user display 1315 can be seen from cars moving in the right hand lane of street 1303 and pedestrians on sidewalk 1301.

As shown in the non-limiting example of FIG. 13A, each of cluster of multi-user displays 1305, multi-user display 1310, and multi-user display 1315 determines a first viewpoint or set of viewpoints within street 1303. According to various embodiments, the first viewpoint is determined based on information obtained from a tracked device (for example, a mobile phone in automobile 1304, or a device providing a vehicle to everything ("V2X") functionality in automobile 1304). In some embodiments, the first viewpoint is predetermined (for example, based on expected sightlines from street 1303.)

Having determined one or more first viewpoints, each of cluster of multi-user displays 1305, multi-user display 1310, and multi-user display 1315 determines one or more items of first content to be displayed to the first controlled viewpoint according to one or more visibility criteria. In this illustrative example, one or more items of first content to be displayed are determined based on information received from the tracked device used to determine the first viewpoint. For example, a V2X device in an automobile or a smartphone in a smartphone may also be operating as a navigation aid to the driver of a vehicle, and may, for example, provide destination information or information regarding the vehicle's current speed. In certain embodiments, the visibility criterion is a negative visibility criterion, and requires that a multi-user display ensure that a display is not visible at a particular viewpoint. For example, in the illustrative example of FIG. 13A, multi-user display 1315, which is located off of the street 1303 and away from the expected field of focus of a driver (e.g., drivers should focus on street 1303, rather than signage in the middle of sidewalk 1301) is configured to display nothing to the first viewpoint. Additionally, according to certain embodiments, the visibility criterion is not a negative visibility criterion (e.g., the content is intended to be fully visible at the first viewpoint). As shown in the illustrative example of FIG. 13A, content relating to a driver's destination is rendered at cluster of multi-user displays 1305 to be fully visible at the first viewpoint, and content relating to the operation of a vehicle (for example, a reminder of the local speed limit) is rendered on multi-user display 1310 to be fully visible at the first viewpoint.

FIG. 13B provides a second view of street scene 1300. In this illustrative of example, each of cluster of multi-user displays 1305, multi-user display 1310 and multi-user display 1315 is capable of providing multiple directional displays, and rendering content to satisfy one or more visibility criteria at a determined viewpoint. In addition to determining and rendering content satisfying visibility criteria at a first viewpoint in street 1303, each of cluster of multi-user displays 1305, multi-user display 1310 and multi-user display 1315 can determine viewpoints on sidewalk 1301, and determine and render content to satisfy visibility criteria at one or more viewpoints on sidewalk 1301.

According to certain embodiments, each of cluster of multi-user displays 1305, multi-user display 1310 and multi-user display 1315 determines one or more viewpoints on sidewalk 1301. In some embodiments, the viewpoints are predetermined, and the content to be displayed at the predetermined is determined based on extrinsic information (for example, a date or time). In the non-limiting example of FIG. 13B, viewpoints on sidewalk 1301 for multi-user display 1315 and cluster of multi-user displays 1305 have been predetermined, and content chosen based on extrinsic data (for example, date information) has been selected for display on multi-user 1315 and cluster of multi-user displays 1305. Similarly, in the explanatory example of FIG. 13B, multi-user display 1310 determines a viewpoint by tracking a person or article which is a trusted proxy for a person (for example, a smartphone, smart watch or other wearable device). According to various embodiments, multi-user display 1310 determines content to be displayed to the person based on an indicator of their identity (for example, facial recognition, or information provided by the trusted proxy device). Further, depending on the content, multi-user display 1310 determines a visibility criterion for displaying the content to the person (for example, a visibility criterion reflecting the relative importance of the intended viewer seeing the displayed content or an unintended viewer not seeing the displayed content), and renders the content according to the visibility criterion. Referring to the non-limiting example of FIG. 13B, multi-user display 1310 determines a shopping list to be content to be displayed to the viewer, and renders the content to be visible to the viewer on sidewalk 1301, but automobile 1304 on street 1303.

FIG. 14 illustrates an example of content selected and rendered for display at a multi-user display based on a visibility criterion and viewing context according to certain embodiments of this disclosure. The example shown in FIG. 14 is for illustration only and other embodiments could be used without departing from the scope of the present disclosure.

Referring to the non-limiting example of FIG. 14, an electronic gaming environment 1400 is shown. According to various embodiments, gaming environment includes a multi-user display 1410, a plurality of controllers (including controllers 1415a and 1415b), and at least one device 1420 associated with a user. In various embodiments, multi-user display 1410 and controllers 1415a and 1415b are connected to a console device, the console device comprising one or more processors (for example, an CPU and GPU) and processor readable instructions (for example, a disc with a game, or a downloaded game file) for providing content associated with multi-user gameplay of a game. In some embodiments, controllers 1415a and 1415b are connected to multi-user display 1410, which in turn, receives data associated with multi-user gameplay of a game. In this illustrative example, multi-user display 1410 is shown as providing graphic content associated with four-player gameplay of a card game (for example, poker, bridge or Canasta) whose rules specify that a player's hand of cards not be shown to other players.

In certain embodiments according to this disclosure, multi-user display 1410 determines a controlled viewpoint for each player of the card game. According to certain embodiments, multi-user display 1410 selects a controlled viewpoint for each player, which in this particular example, comprises four controlled viewpoints. Persons of ordinary skill will appreciate that, here, as elsewhere in this disclosure, embodiments with more or fewer controlled viewpoints are possible and within the contemplated scope of this disclosure. In some embodiments according to this disclosure, multi-user display 1410 determines the controlled viewpoints based on location data (for example, internal measurement unit (IMU) sensor) received from devices which act as reasonable proxies for a viewer's location, such as controller 1415a or device 1420. In certain embodiments, multi-user display 1410 determines the controlled viewpoints for players from data (for example, image data showing the locations of recognized faces in a field of view of multi-user display 1410) collected by a field sensor (for example, field sensor 360 in FIG. 3). In various embodiments according to this disclosure, the controlled viewpoints associated with viewers may be predetermined and mapped to viewing angles relative to multi-user display 1410.

According to certain embodiments, multi-user display 1410 determines content to be displayed to each of the controlled viewpoints according to a visibility criterion. In this illustrative example, the visibility criteria for each controlled viewpoint include that the content not be visible from other controlled viewpoints to ensure that players not "peek" at each other's cards. As shown in the non-limiting example of FIG. 14, multi-user display 1410 determines one hand of the four hands of cards shown on multi-user display 1410 as content to be displayed to each controlled viewpoint—essentially dividing the display area of multi-user display 1410 into four quadrants. According to some embodiments, determining content for each field of view is assisted by the control logic of the game—for example, through instructions in the game code specifying content and or regions of the display as being assigned to particular viewpoints. In various embodiments, determining content for each field of view is performed, at least in part, on an analysis of the graphic content to be displayed. For example, in certain embodiments, pixel control logic (for example, pixel control logic 230 in FIG. 2) identifies repeating structures (for example, hands of cards) or static partitions (for example, vertical line 1450), and identifies by inference, content to be displayed to controlled viewpoints.

Referring to the non-limiting example of FIG. 14, having determined content associated with each controlled viewpoint, multi-user display 1410 determines a subset of pixels of a pixelated array whose visibility from the controlled viewpoint satisfies the visibility criterion, and for each viewpoint, renders the determined content to be displayed on the determined subset of pixels (or sub-pixels). As shown in the non-limiting example of FIG. 14, the operations of determining the pixels (or sub-pixels) satisfying the visibility criterion and rendering the content to be displayed on the pixels produces four separate directional displays, 1431, 1433, 1435 and 1437, each of which satisfy visibility criteria requiring them to be visible at only one controlled viewpoint. In this way, multi-user display 1410 provides, on a single device, a platform for a multi-user gaming experience with enforced privacy between players' views.

While FIG. 14 describes an example in which systems and methods for providing a multi-user display according to this disclosure are configured to enforce the privacy of four views of multi-user display 1410, embodiments according to this disclosure are not so limited, and other configurations to satisfy other visibility criteria associated with other viewing contexts are possible and within the contemplated scope of this disclosure. As one, non-limiting example, in some embodiments, each of the four quadrants of multi-user display 1410 shown in FIG. 14 supports three directional displays, meaning that, instead of enforcing four private displays for four users, content is rendered at multi-user display 1410 to provide three directional displays for 12 users.

Figure 15A:
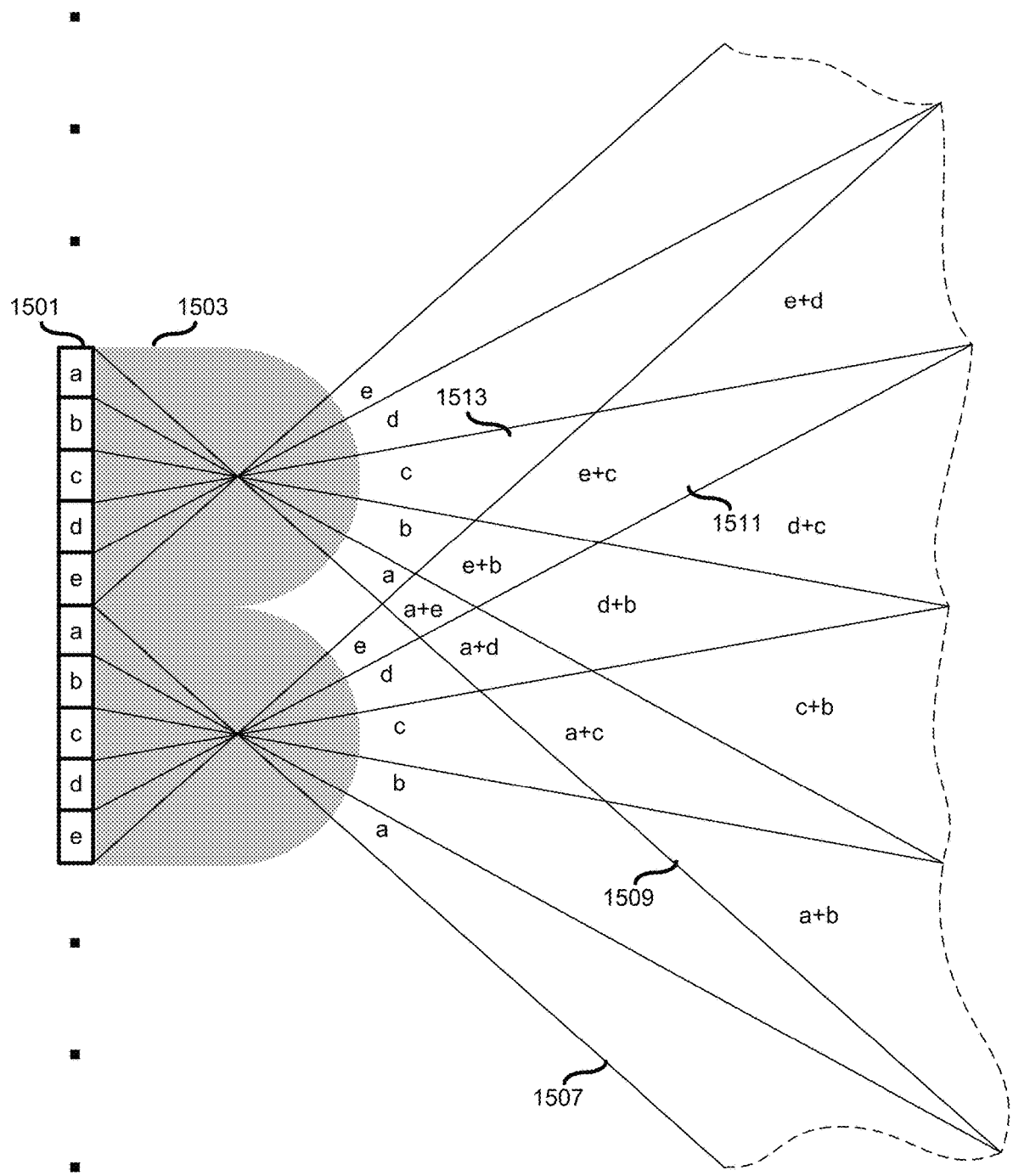

FIGS. 15A and 15B illustrate an example of content selected and rendered for display at a multi-user display based on a visibility criterion and viewing context according to certain embodiments of this disclosure. The embodiments shown in FIGS. 15A and 15B are for illustration only and other embodiments could be used without departing from the scope of the present disclosure.

Referring to the non-limiting example of FIG. 15A, a section of pixelated array 1501 is shown as passing light through a section of an optical multiplexer 1503. According to certain embodiments, optical multiplexer 1503 is a lenticular array (as shown in the illustrative example of FIG. 15A). In various embodiments applying the principles described with reference to FIG. 15A, optical multiplexer 1503 is a parallax barrier.

According to various embodiments, the pixels of pixelated array 1501 are configured to render five (5) items of visual content, lettered "a" through "e" in FIG. 15A. In some embodiments, each item of visual content comprises all of a directional display—for example, the pixels designated "a" collectively comprise all of the pixels of a directional display of a game show program. That is, all of the visual information associated with the game show program is rendered on the "a" pixels.

In certain embodiments, the individual items of visual content designated "a" through "e" in FIG. 15A comprise only part of a directional display. As a non-limiting example, visual content associated with a game show program is rendered on the "a" pixels and the "c" pixels of FIG. 15A. In other words, in this non-limiting example, the game show program is only fully visible at controlled viewpoints to which the outputs of the "a" and "c" pixels are directed by optical multiplexer 1503.

Referring to the non-limiting example of FIG. 15A, the lensing effect of optical multiplexer 1503 creates regions within the field of view of pixelated array 1501 in which the output of only a single group of pixels is visible. For example, only the output of the "a" pixels is visible at region 1507. Similarly, the lensing effect of optical multiplexer 1503 creates regions within the field of view of pixelated array 1501 in which the output of combinations of pixel groups are visible. For example, the combined output of the "b" and "a" pixels is visible in region 1509, and the combined output of the "c" and "e" pixels is visible in region 1511, but not in adjacent region 1513, in which only the output of the "c" pixels is visible.

According to certain embodiments, and as shown in FIG. 15A, by spatially encoding content to be rendered, or otherwise splitting visual content to be rendered across different groups of pixels, it is possible to not only control the viewing angle at which content of a multi-user display is visible, but also the viewing distance at which the content is visible.

It should be noted that FIG. 15A illustrates the creation of regions within the field of view of pixelated array 1501 by spatially encoding content across the pixels of pixelated array 1501. The dotted lines in FIG. 15A indicate that additional viewing regions beyond what is illustrated by the figure. Similarly, the ellipses bounding pixelated array 1501 indicate that, in certain embodiments, pixelated array 1501 can extend beyond the portion illustrated in the figure.

FIG. 15B provides a further illustrative example of the principles described with reference to FIG. 15A of this disclosure. Referring to the non-limiting example of FIG. 15B, in certain embodiments according to this disclosure, a visibility criterion for content to be displayed at a controlled viewpoint includes a viewing distance (or range of viewing distances) at which content is to be visible. In certain embodiments, the visibility criterion is a negative visibility criterion and comprises a range of viewing distances at which the content is not visible.

In certain embodiments according to this disclosure, a multi-user display 1510 determines pixels which satisfy a viewing distance related visibility criterion by spatially encoding the content to be displayed across multiple regions of a pixelated array (or across multiple pixelated array), such that the content is only visible at a distance where the directed output of the regions of the pixelated array converge. According to some embodiments, multi-user display 1510 is a touchscreen display, and spatially encoding content according to viewing distance is performed in order to display different content to controlled viewpoints in a near field of multi-user display 1510 than to controlled viewpoints in a far field of multi-user display 1510.

In the illustrative example of FIG. 15B, a multi-user display 1510 containing a pixelated array, and a controlled viewpoint 1515 are shown. As shown in FIG. 15B, controlled viewpoint 1515 is located at a viewing distance 1520 and lateral offset 1525 relative to multi-user display 1510. In this illustrative example, content to be visible at viewing distances at or around viewing distance 1520 is spatially encoded to be visible at a region 1550 comprising controlled viewpoint 1515, and to not be visible elsewhere.

As shown in the illustrative example of FIG. 15B, the content to be displayed to controlled viewpoint 1515 is spatially encoded by being divided between two or more sets of pixels with a predetermined incidence (and by implication, directionality of display) relative to the optical multiplexer of multi-user display 1510. Further as shown by FIG. 15B, the content to be displayed at controlled viewpoint 1515 is spatially multiplexed across the length of the pixelated array of multi-user display 1510. In certain embodiments, because the content to be displayed is spatially encoded, and split between two or more groups of pixels of the pixelated array of multi-user display 1510, the spatially encoded content is only fully visible in the regions where the each of the constituent groups of pixels are visible. In this particular example, the visible regions comprise the diamond-shaped region 1550 of a field of view of multi-user display 1510 where the outputs of two groups of pixels converge in the field of view of multi-user display 1510.

While the explanatory examples of FIG. 15A and FIG. 15B describes spatially encoding content by splitting visual content among only two groups of pixels, embodiments according to the present disclosure are not so limited. In certain embodiments, content can be spatially encoded, or split among groups of pixels having a predetermined relationship to an optical multiplexer according to an arbitrary number of groups of pixels, thereby adding further dimensions to the directional and distance control over the content.

FIG. 16 illustrates operations of a method 1600 for providing a multi-user display according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor and display in, for example, a multi-user display system.

Referring to the non-limiting example of FIG. 16, method 1600 includes operation 1605, wherein one or more controlled viewpoints (for example viewpoint 1515 in FIG. 15B) of a multi-user display (for example, a multi-user display comprising a pixelated array, such as multi-user display 200 in FIG. 2) are determined. According to various embodiments, the one or more controlled viewpoints are determined by control logic (for example, pixel control logic 230 in FIG. 2) of the multi-user display. In certain embodiments, the controlled viewpoints are predetermined (for example, first viewpoint 971 in FIG. 9).

According to various embodiments of this disclosure, at operation 1610, a multi-user display (or control logic for a multi-user display) determines, for each controlled viewpoint determined at operation 1605, content to be displayed at the controlled viewpoint according to one or more visibility criteria. In certain embodiments according to this disclosure, the one or more visibility criteria comprise a requirement that the content be visible (for example, such as content 881 in FIG. 8) to the viewpoint. In some embodiments according to this disclosure, the one or more visibility criteria comprise a negative visibility requirement (for example, the content on multi-user display 1315 in FIG. 13A). In various embodiments according to this disclosure, the one or more visibility criteria comprise a combination of positive and negative visibility criteria (for example, directional display 1433, which is rendered to be visible to a particular user, and not visible to three other users).

In various embodiments according to this disclosure, at operation 1615, a multi-user display determines, for each viewpoint of the one or more subset of controlled viewpoints, a subset of pixels of a pixelated array (for example, color filter 310 in FIG. 3) whose visibility from the controlled viewpoint satisfies each of the one or more visibility criteria. According to various embodiments, the subset of pixels determined by the multi-user display at operation 1615 comprises, without limitation, a subset of pixels associated with one or more viewing angles (for example, the groups of pixel columns designated "A," "B," "C" and "D" in FIG. 6). In certain embodiments, the subset of pixels determined by the multi-user display at operation 1615 comprises one or more regions of a pixelated array for spatially encoding content to be displayed (for example, first region 1530 in FIG. 15B). In various embodiments, the subset of pixels determined by the multi-user display at operation 1615 comprises a set of pixels whose viewing angles converge at a particular viewpoint (for example, viewpoint 710 in FIG. 7). According to some embodiments, the subset of pixels determined by multi-user display at 1615 comprises a combination of the above.

As shown in the non-limiting example of FIG. 16, at operation 1620, for each controlled viewpoint, the multi-user display (for example, multi-user display 810 in FIG. 8) renders the content determined at operation 1610 for display on the pixels determined at operation 1615, thereby creating one or more directional displays of content (for example, first content 1045 in FIG. 10) which satisfy the visibility criteria at a controlled viewpoint.

FIG. 17 illustrates operations of methods for providing a multi-user display according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor and display in, for example, a multi-user display system. In certain embodiments, the operations described with reference to FIG. 17 are performed in addition to, or as part of the operations of another method (for example, method 1600 in FIG. 16) for providing a multi-user display according to some embodiments of this disclosure.

Referring to the non-limiting example of FIG. 17, at operation 1705, a multi-user display (for example, multi-user display 1110 in FIG. 11) tracks a viewer of the multi-user display. According to certain embodiments, the multi-user display tracks the viewer based on sensor data (for example, image data from field sensor 1115a in FIG. 11) obtained by the multi-user display. In various embodiments, at operation 1705, the multi-user display tracks the viewer by tracking a device (for example, device 1420 in FIG. 14) or other proxy for the viewer's location.

According to certain embodiments, at operation 1710, the multi-user display (for example, multi-user display 960 in FIG. 9) determines a position of the viewer. In certain embodiments, the position of the viewer is determined based on tracking the viewer. In various embodiments, the position of the viewer is predetermined (for example, in certain embodiments, the position of a viewer in street 1303 in FIG. 13 is predetermined. According to various embodiments, at operation 1715, the multi-user display determines a controlled viewpoint of the multi-user display based on the determined position of the viewer.

As shown in the non-limiting example of FIG. 17, at operation 1720, a multi-user display (for example, multi-user display 810 in FIG. 8) identifies one or more viewers of the directional display. According to some embodiments, the identification of the viewer is performed based on a facial or other biometric recognition operation. In some embodiments, the identification of the viewer of the multi-user display at operation 1720 is performed based on a device providing a trusted indicia of a viewer's identity (for example, registered viewer "B's" smart watch in the illustrative example of FIG. 8). In certain embodiments, the identification performed at operation 1720 is a positive, or confirming operation (e.g., determining that a particular viewer is the viewer known as "John Smith"). In some embodiments, the identification performed at operation 1720 is a negative identification (for example, confirming that viewer "C" in FIG. 8 is not a registered viewer).

In certain embodiments according to this disclosure, at operation 1725, a multi-user display (for example, multi-user display 1310 in FIG. 13B) determines content to be displayed to a determined viewpoint based on an identification of a viewer at the determined viewpoint (for example, the shopping list displayed on multi-user display 1310 in FIG. 13B).

FIG. 18 illustrates operations of methods for providing a multi-user display according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor and display in, for example, a multi-user display system. In certain embodiments, the operations described with reference to FIG. 18 are performed in addition to, or as part of the operations of another method (for example, method 1600 in FIG. 16, and/or the operations described with reference to FIG. 17) for providing a multi-user display according to some embodiments of this disclosure.

Referring to the non-limiting example of FIG. 18, at operation 1805, a multi-user display, (for example, cluster of multi-user displays 1305 in FIG. 13A) determines the position and/or identity of a viewer from a device associated with the viewer in a field of view of the multi-user display. According to certain embodiments, the multi-user display determines the position and/or identity of the viewer based on signals transmitted by the device to the multi-user display (for example, a device providing a V2X functionality in automobile 1304 in FIG. 13A). In some embodiments, the multi-user display determines the position and/or identity of the viewer through object recognition (for example, based on the form, or other machine recognizable indicia of the device's location and identity) of the device (for example, controller 1415a in FIG. 14).

According to certain embodiments, at operation 1810, the multi-user display determines a viewing context of the multi-user display. As used in this disclosure, the term "viewing context" encompasses a logical association between visibility criteria, controlled viewpoints, and content to be rendered to be visible at the controlled viewpoints. For example, in the illustrative example of FIG. 10, the viewing context "line of people waiting to pass through a door" associates different visibility criteria to different controlled viewpoints (e.g., people near the front of the queue see first content, people in the middle of the queue see second content, and people at the end of the queue see third content.) According to various embodiments, viewing contexts can be predetermined (e.g., programmed in advance), conditional (e.g., determined through the application of rules to specified inputs (for example, number of viewers, date, time, etc.) and/or dynamic.

In various embodiments according to this disclosure, at operation 1815, a multi-user display selects or determines a visibility criterion based on the viewing context. In the non-limiting example of FIG. 13A, multi-user display 1315 determines (for example, by performing operation 1810) that the current viewing context includes controlled viewpoints located in both street 1303 and sidewalk 1301. According to certain embodiments, because the current viewing context of multi-user display 1315 includes viewers in both street 1303 and sidewalk 1301, the pixel control logic (for example, pixel control logic 230 in FIG. 2), may, for safety reasons, assign a negative visibility criterion to pixels whose output is directed towards a controlled viewpoint in street 1303.

Referring to the non-limiting example of FIG. 18, at operation 1820, a multi-user display determines a viewing context associated with one or more of a privacy requirement (for example, ensuring that directional display 1431 in FIG. 14 is visible at one controlled viewpoint, and not at any of the other three controlled viewpoints, an application type (for example, a game dividing the area of the multi-user display), a device type (for example, vehicle based multi-user display 960 in FIG. 9), a context determined from the content to be displayed (for example, a determination that, as personal data, the shopping list shown on display 1310 in FIG. 13B should have limited visibility), a current location (for example, the navigation information provided to an automobile on cluster of multi-user displays 1305 in FIG. 13A), a selected visual effect (for example, the "magic mirror" effect provided by multi-user display 1210 in FIG. 12), a selected visual effect (for example, correcting "keystone" like effects arising when a rectangular display is viewed off-axis), or an identified condition in a field of view (for example, the detection of unregistered viewer "C" in the illustrative example of FIG. 8).

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method, comprising:
   at a multi-user display comprising a pixelated array and a directional multiplexer, determining one or more controlled viewpoints of the multi-user display;
   for each viewpoint of the one or more controlled viewpoints, determining first content to be displayed to the controlled viewpoint according to a visibility criterion;
   for each viewpoint of the one or more controlled viewpoints, determining a first subset of pixels of the pixelated array whose visibility from the controlled viewpoint satisfies the visibility criterion; and
   rendering the first content to be displayed on the first subset of pixels of the pixelated array,
   wherein each controlled viewpoint of the one or more controlled viewpoints comprises a point in a field of view of the multi-user display within a range of viewing angles and within a range of distances from the multi-user display.

2. The method of claim 1, further comprising:
   tracking a viewer of the multi-user display;
   determining a position of the viewer; and
   determining a controlled viewpoint of the multi-user display based on the position of the viewer.

3. The method of claim 2, further comprising:
   identifying the viewer of the multi-user display; and
   based on identifying the viewer, determining the first content to be displayed.

4. The method of claim 2, further comprising:
   determining one or more of the position of the viewer or an identity of the viewer from a device associated with the viewer in a field of view of the multi-user display.

5. The method of claim 1, further comprising:
   determining a viewing context of the multi-user display; and
   for a viewpoint of the one or more controlled viewpoints, selecting the visibility criterion based on the viewing context.

6. The method of claim 5, wherein the viewing context is associated with one or more of a privacy requirement, an application type, a device type, a viewing context determined from content to be displayed, a current location of the multi-user display, a perspective correction, a selected visual effect, or an identified condition in a field of view of the multi-user display.

7. The method of claim 1, wherein the pixelated array comprises one or more of a backlit light filter, an organic light emitting diode (OLED) array, an electronic paper display, an electrophoretic display, an electrowetting display, or an electrofluidic display.

8. The method of claim 1, wherein the directional multiplexer comprises one or more of a parallax barrier or a lenticular layer.

9. A multi-user display comprising:
   a pixelated array;
   a directional multiplexer; and
   control logic configured to:
      determine one or more controlled viewpoints of the multi-user display,
      for each viewpoint of the one or more controlled viewpoints, determine first content to be displayed to the controlled viewpoint according to a visibility criterion,
      for each viewpoint of the one or more controlled viewpoints, determine a first subset of pixels of the pixelated array whose visibility from the controlled viewpoint satisfies the visibility criterion, and
      render the first content to be displayed on the first subset of pixels of the pixelated array,
      wherein each controlled viewpoint of the one or more controlled viewpoints comprises a point in a field of view of the multi-user display within a range of viewing angles and a range of distances from the multi-user display.

10. The multi-user display of claim 9, wherein the control logic is further configured to:
    track a viewer of the multi-user display,
    determine a position of the viewer, and determine a controlled viewpoint of the multi-user display based on the position of the viewer.

11. The multi-user display of claim 10, wherein the control logic is further configured to:
identify the viewer of the multi-user display, and
based on identifying the viewer, determine the first content to be displayed.

12. The multi-user display of claim 10, wherein the control logic is further configured to:
determine one or more of the position of the viewer or an identity of the viewer from a device associated with the viewer in a field of view of the multi-user display.

13. The multi-user display of claim 9, wherein the control logic is further configured to:
determine a viewing context of the multi-user display, and
for a viewpoint of the one or more controlled viewpoints, select the visibility criterion based on the viewing context.

14. The multi-user display of claim 13, wherein the viewing context is associated with one or more of a privacy requirement, an application type, a device type, a viewing context determined from content to be displayed, a current location of the multi-user display, a perspective correction, a selected visual effect, or an identified condition in a field of view of the multi-user display.

15. The multi-user display of claim 9, wherein the pixelated array comprises one or more of a backlit light filter, an organic light emitting diode (OLED) array, an electronic paper display, an electrophoretic display, an electrowetting display, or an electrofluidic display.

16. The multi-user display of claim 9, wherein the directional multiplexer comprises one or more of a parallax barrier or a lenticular layer.

17. A non-transitory computer-readable medium containing instructions, which when executed by a processor, cause a multi-user display to:
at the multi-user display comprising a pixelated array and a directional multiplexer, determine one or more controlled viewpoints of the multi-user display;
for each viewpoint of the one or more controlled viewpoints, determine first content to be displayed to the controlled viewpoint according to a visibility criterion;
for each viewpoint of the one or more controlled viewpoints, determine a first subset of pixels of the pixelated array whose visibility from the controlled viewpoint satisfies the visibility criterion; and
render the first content to be displayed on the first subset of pixels of the pixelated array,
wherein each controlled viewpoint of the one or more controlled viewpoints comprises a point in a field of view of the multi-user display within a range of viewing angles and within a range of distances from the multi-user display.

18. The non-transitory computer-readable medium of claim 17, further comprising instructions, which when executed by the processor, cause the multi-user display to:
track a viewer of the multi-user display;
determine a position of the viewer; and
determine a controlled viewpoint of the multi-user display based on the position of the viewer.

19. The non-transitory computer-readable medium of claim 18, further comprising instructions, which when executed by the processor, cause the multi-user display to:
identify the viewer of the multi-user display; and
based on identifying the viewer, determine the first content to be displayed.

20. The non-transitory computer-readable medium of claim 18, further comprising instructions, which when executed by the processor, cause the multi-user display to:
determine one or more of the position of the viewer or an identity of the viewer from a device associated with the viewer in a field of view of the multi-user display.

* * * * *